US012238668B2

United States Patent
Sun et al.

(10) Patent No.: US 12,238,668 B2
(45) Date of Patent: Feb. 25, 2025

(54) NODES AND METHODS FOR HANDLING STATE CHANGE OF A COMMUNICATION LINK IN A COMMUNICATIONS NETWORK

(71) Applicant: Telefonaktiebolaget LM Ericsson (publ), Stockholm (SE)

(72) Inventors: Erqun Sun, Shanghai (CN); Debashish Pattnaik, Shanghai (CN); Mikael Klein, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 294 days.

(21) Appl. No.: 17/754,997

(22) PCT Filed: Oct. 18, 2019

(86) PCT No.: PCT/CN2019/111791
§ 371 (c)(1),
(2) Date: Apr. 18, 2022

(87) PCT Pub. No.: WO2021/072725
PCT Pub. Date: Apr. 22, 2021

(65) Prior Publication Data
US 2022/0394651 A1    Dec. 8, 2022

(51) Int. Cl.
*H04W 4/00* (2018.01)
*H04L 67/55* (2022.01)
*H04L 69/28* (2022.01)
*H04W 60/00* (2009.01)
*H04W 68/00* (2009.01)

(52) U.S. Cl.
CPC ............ *H04W 60/00* (2013.01); *H04L 67/55* (2022.05); *H04L 69/28* (2013.01); *H04W 68/005* (2013.01)

(58) Field of Classification Search
CPC .... H04W 60/00; H04W 68/005; H04L 67/55; H04L 69/28; H04L 65/1016; H04L 65/1073; H04L 65/1104; Y02D 30/70
See application file for complete search history.

(56) References Cited

U.S. PATENT DOCUMENTS 9,565,218 B2 * 2/2017 Gangadharan .......... H04L 67/55
9,648,052 B2 * 5/2017 Gangadharan ...... H04L 65/1104
10,148,487 B2 * 12/2018 Kunz .................. H04L 65/1045
(Continued)

FOREIGN PATENT DOCUMENTS

CN        106850125 A    6/2017
WO     2018121875 A1    7/2018

OTHER PUBLICATIONS

Corrected International Search Report and Written Opinion for Application No. PCT/CN2019/111791, dated Apr. 29, 2021, 7 pages.
(Continued)

*Primary Examiner* — Stephen M D Agosta
(74) *Attorney, Agent, or Firm* — Nicholson De Vos Webster & Elliott LLP

(57) ABSTRACT

A method performed by a first communication node for handling state change of a communication link in a communications network. The first communication node subscribes to state information indicating a state change of a communication link between a UE and a second communication node. The first communication node obtains, from the second communications node, the state information indicating the state change.

10 Claims, 19 Drawing Sheets

(56) References Cited

U.S. PATENT DOCUMENTS

| | | | |
|---|---|---|---|
| 10,212,192 B2* | 2/2019 | Wallis | H04L 67/55 |
| 10,447,741 B2* | 10/2019 | Ravichandran | H04L 65/1016 |
| 10,523,720 B2* | 12/2019 | Hallenstål | H04W 24/04 |
| 10,992,634 B2* | 4/2021 | Jang | H04L 51/23 |
| 11,082,458 B2* | 8/2021 | Mufti | H04L 65/102 |
| 11,146,649 B2* | 10/2021 | Knoulich | H04L 67/53 |
| 11,206,528 B1* | 12/2021 | Synal | H04W 8/20 |
| 11,277,450 B2* | 3/2022 | El-Gawady | H04L 65/1104 |
| 11,368,933 B2* | 6/2022 | Stille | H04W 76/38 |
| 2008/0130532 A1* | 6/2008 | Maenpaa | H04W 76/38 370/310 |
| 2010/0189036 A1* | 7/2010 | Liu | H04W 60/02 370/328 |
| 2011/0128936 A1* | 6/2011 | Kim | H04W 36/0016 370/331 |
| 2012/0173610 A1* | 7/2012 | Bleau | H04L 67/55 709/203 |
| 2012/0214480 A1* | 8/2012 | Ionescu | H04W 4/50 455/425 |
| 2014/0222890 A1* | 8/2014 | Zhu | H04L 65/1104 709/203 |
| 2014/0222893 A1* | 8/2014 | Gangadharan | H04L 65/1069 709/203 |
| 2014/0222894 A1* | 8/2014 | Gangadharan | H04L 65/1033 709/203 |
| 2014/0222957 A1* | 8/2014 | Gangadharan | G06F 8/31 709/217 |
| 2014/0287733 A1* | 9/2014 | Mach | H04W 52/0258 455/418 |
| 2015/0163745 A1* | 6/2015 | Kim | H04W 76/28 370/311 |
| 2016/0219083 A1 | 7/2016 | Gangadharan et al. | |
| 2016/0219093 A1* | 7/2016 | Gangadharan | H04N 21/00 |
| 2018/0198830 A1* | 7/2018 | Wallis | H04L 65/1069 |
| 2018/0213008 A1* | 7/2018 | Singh | H04L 65/1045 |
| 2018/0248920 A1* | 8/2018 | Nomani | H04L 65/1104 |
| 2018/0279128 A1* | 9/2018 | Zaifuddin | H04L 65/1096 |
| 2019/0312916 A1* | 10/2019 | Siddappa | H04L 65/1073 |
| 2024/0205696 A1* | 6/2024 | Gutman | H03F 1/3247 |

OTHER PUBLICATIONS

C. Holmberg et al., "Push Notification with the Session Initiation Protocol (SIP) draft-ietf-sipcore-sip-push-20," Oct. 19, 2018, 30 pages, SIPCORE Working Group, Internet-Draft, 2018 IETF Trust and the persons identified as the document authors.

Ericsson et al., "Support Push Notifications in IMS to Enable IMS Downloadable Applications," Feb. 25-Mar. 1, 2019, 5 pages, SA WG2 Meeting #130, S2-1901469, Tenerife, Santa Cruz.

International Preliminary Report on Patentability, PCT App. No. PCT/CN2019/111791, Apr. 28, 2022, 5 pages.

Supplementary European Search Report and Search Opinion, EP App. No. 19949043.4, Jun. 14, 2023, 8 pages.

Communication pursuant to Article 94(3) EPC, EP App. No. 19949043. 4, May 21, 2024, 6 pages.

* cited by examiner

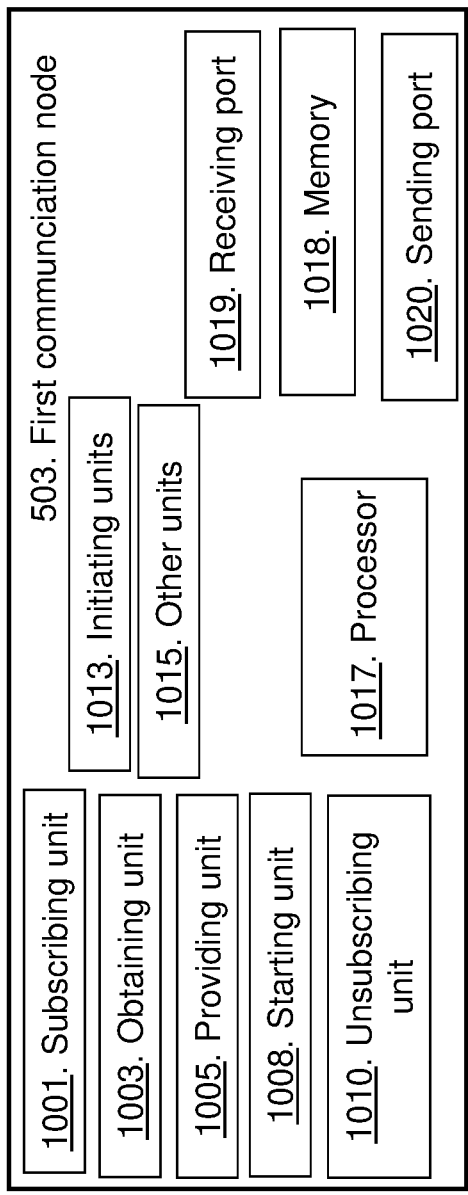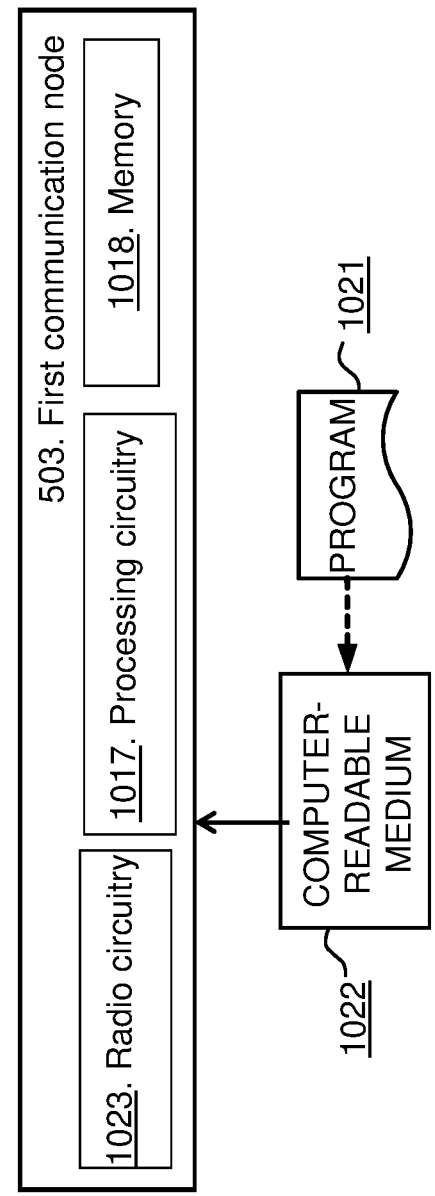
Fig. 9a
Fig. 9b

NODES AND METHODS FOR HANDLING STATE CHANGE OF A COMMUNICATION LINK IN A COMMUNICATIONS NETWORK

CROSS-REFERENCE TO RELATED APPLICATIONS

This application is a National stage of International Application No. PCT/CN2019/111791, filed Oct. 18, 2019, which is hereby incorporated by reference.

TECHNICAL FIELD

Embodiments herein relate generally to a first communication node, a method performed by the first communication node, a second communication node and a method performed by the second communication node. More particularly the embodiments herein relate to handling state change of a communication link in a communications network.

BACKGROUND

A push notification, also known as a server push notification, is the delivery of information to a User Equipment (UE) from an application server where the request for the notification is initiated by the application server rather than by an explicit request from the UE. The UE may also be referred to as a computing device, a client device, a client etc.

In order to save resources, e.g. battery life, some UEs and operating systems will suspend applications when they are not used. In some cases, internal timers in the UE cannot be used to wake such applications, nor will incoming network traffic wake the application. Instead, one way to wake the application in the UE is by using a Push Notification Service (PNS). The PNS may be provided by a server, e.g. a PNS server. Typically, each operating system uses a dedicated PNS.

The Third Generation Partnership Project (3GPP) has defined the PNS in a Proxy-Call Session Control Function (P-CSCF) which supports sending a push notification request to a PNS. The push notification request has to be used to wake up the UE for terminating a service—like terminating calls for WiFi calling. This is illustrated in FIG. 1. FIG. 1 shows an UE 101. The UE 101 may comprise zero, one or more applications (app). The UE 101 is adapted to communicate, e.g. via WLAN access, with a P-CSCF 103 via a Gm' interface. The P-CSCF 103 is adapted to communicate with an IMS core network 108 via the Gm' interface. The abbreviation IMS is short for Internet Protocol Multimedia Subsystem. The IMS core network 108 comprises one or more core network nodes (not shown in FIG. 1), and the IMS core network 108 is adapted to deliver Internet Protocol (IP) multimedia services. The UE 101 may be referred to as an IMS UE.

The dotted arrows in FIG. 1 represents signaling flows and the solid arrows represent media flows.

The UE 101 is adapted to communicate with an Access Gateway (AGW) 105 via an Mb interface, and the AGW 105 is adapted to communicate with the IMS core network 108 via the Mb interface. The P-CSCF 103 may transmit a push request 118 to a Push Notification Service (PNS) server 113. The PNS server 113 is adapted to communicate with the UE 101 via a communication link 120. The PNS server 113 may also be referred to as a Push Notification Server (PNS), a PNS node, a push service function, a push service node, a push notification node etc.

In case the UE 101 comprises an application, the P-CSCF 103 may be responsible for sending the push notification request to the application server to wake up the application in the UE 101 when there is a terminating request targeted to that application, or when the P-CSCF 103 wants to wake up the application for re-registration to the IMS core network 108.

At least some of the following information is conveyed by the registering of an application to the P-CSCF 103 at registration in the IMS core network 108.

The address of the application server, i.e. the P-CSCF 103.

Additional information required by the UE vendor to identify the application 102.

The UE 101 may also transmit Push Notification parameters" that it receives from the PNS Server 113 to the P-CSCF 103, e.g. PN-Provider, PN-Param, PN-PrId etc.

When there is an incoming request targeted for this application, the P-CSCF 103 constructs a push notification request 118 and sends it to the application server. The application server sends the push notification request 118 to the UE 101 and wakes up the application 102 comprised in the UE 101. This results in the application re-registering in the IMS core network 108 and subsequently receiving the incoming request and handling the request accordingly.

The core network may be referred to as an IMS core network. The application 102 may be referred to as an IMS application.

In current push notification handling, the applications 102 are allowed to use Voice over IP (VoIP) Push Notification (PN) only for incoming voice and/or video calls. Basically, on reception of VoIP PN, the app 102 is required to take an action that leads the UE's 102 User Interface (UI) to show the incoming call on the screen.

Any misuse of the VoIP PN, will lead the app 102 to stop working and/or receiving PN. Today, the entire P-CSCF logic is based on VoIP PN and the reliability of those PNs may be used to wake up the app 102 and to register to the IMS Core network 109—therefore the current wake-up mechanism is not compliant with the push notification handling.

A current wake-up mechanism for awaking an app 102 in an UE 102 is based on a push solution to maintain the IMS (re)registration is as well based on VoIP PN and it is therefore not allowed anymore.

The VoIP push kit is used for VoIP push only, which implies it shall severely impact the "registration alert" push solution i.e. a push to wake up the UE 101 and let it send re-registration to the IMS core network 108 to maintain it registration state.

FIG. 2 illustrates a push based wake-up solution which is blocked by the UEs Operating System (OS). The term wake-up refers to waking up a UE from a sleep mode, i.e. changing the UE mode from sleep to awake. In a push based solution, messages such as e.g. a push notification, is pushed to the UE 101. When a message is pushed, it may not necessarily require any action to be performed by the UE 101 upon receiving the push message. A push message may be sent without first receiving a request for the message, e.g. the push message is sent without the UE 101 having asked for it. In FIG. 2, the UE 101 comprises a push client or is adapted to perform a push function, and the UE 101 is in sleep mode. When the UE 101 is in sleep mode, any applications comprised in the UE 101 are also in sleep mode. In step 201 in FIG. 2, the P-CSCF detects that a session associated with the UE 101 is about to expire. The P-CSCF 103 sends a register alert message to the PNS server 113 in step 202. The PNS server 113 sends a push notification message to the UE 101 in step 203. The push notification message indicates to awake and re-register the UE 101. In step 204, the UE 101 sends a Session Initiation Protocol (SIP) re-registration message to the P-CSCF 103. The P-CSCF 103 sends a re-registration message to the IMS core network 108 in step 205. In step 206, the IMS core network 108 updates its register with information indicating the session expiry of the client.

In FIG. 2, the UE 101, e.g. it's operating system (OS), will block the P-CSCF 103 from triggering a push notification in step 202. As a result, all subsequent steps 230, 204, 205, 206 can no longer be triggered on its own. Therefore, if the push client comprised in the UE 101 goes on to sleep mode by detaching itself from the IMS core network 108, it can no longer be re-registered or stay connected with the IMS core network 108 any longer. After the expiry of initial registration session, the subscriber information shall be erased from IMS core network 108 and hence all terminating calls destined for that particular push client shall be dropped by IMS core network 108.

FIGS. 3a-3b are signaling diagrams illustrating a current method for initial registration of a UE 101 comprising a push client or adapted to perform a push function. FIG. 3a illustrates steps 301-308 and FIG. 3b illustrates steps 309-315. FIG. 3b is a continuation of FIG. 3 such that steps 301-308 is performed first, and then steps 309-315. The method illustrated in FIGS. 3a and 3b involves steps performed by the UE 101, the P-CSCF 103, the PNS server 113, an authentication server 115 and the IMS core network 108. Interrogating-Call Session Control Function (I-CSCF) 108a, a Serving-Call Session Control Function (S-SCSF) 108b, a Home Subscriber Server (HSS) 108c and a Telephony Application Server (TAS) 108b may be examples of core network nodes comprised in the IMS core network 108 which may participate in the method illustrate in FIGS. 3a and 3b. The authentication server 115 and the IMS core network 108, e.g. represented by the HSS 108c, are provisioned with UE credentials. The UE credentials may also be referred to as client credentials. The UE 101 may also be referred to as a push client or to comprise a push client. A push client may be described a client adapted to push messages, notifications, information etc. within the communication network. The term authentication may be referred to as auth., for the sake of simplicity. The auth. server 115 may be referred to as an auth. node, an auth. function etc. The HSS 108c may be an example of a subscriber server, and any other suitable subscriber may be applicable to the method.

The method illustrated in FIGS. 3a and 3b comprises at least one of the following steps, which steps may be performed in any suitable order than described below:

Step 301

This step is seen in FIG. 3a. The UE 101 transmits a registration message to the PNS server 113. The registration message indicates that the UE 101 should be registered in the PNS server 113. The PNS server 113 receives the registration from the UE 101, and registers the UE 101.

The UE 101 may comprise one or more applications, and the registration message may be associated with registration of an application instead or in addition to registration of the UE 101.

Step 302

This step is seen in FIG. 3a. The PNS server 113 transmits a registration successful message to the UE 101. This message may be sent after the PNS server 113 has successfully registered the UE 101 and/or successfully registered the application comprised in the UE 101. The message comprises push service information.

Step 303

This step is seen in FIG. 3a. The UE 101 transmits an IMS registration message to the P-CSCF 103. The IMS registration message comprises the push service information that the UE 101 is received in step 302. The IMS registration message indicates that the P-CSCF 103 should register the UE 101 in the IMS core network 108. The P-CSCF 103 receives the IMS registration message from the UE 101.

Instead of or in addition to that the IMS registration message indicates registration of the UE 101, the IMS registration message may indicate registration of one or more applications comprised in the UE 101.

Step 304

This step is seen in FIG. 3a. The P-CSCF determines that is has not found any registered session for the UE 101.

Step 305

This step is seen in FIG. 3a. The P-CSCF sends an IMS registration message to the IMS core network 108, e.g. to the I-CSCF 108a comprised in the IMS core network 108. The I-CSCF receives the IMS registration message from the P-CSCF 103.

Step 306

This step is seen in FIG. 3a. The I-CSCF 108a sends the IMS registration message further to the S-CSCF 108b. The S-CSCF 108b receives the IMS registration message form the I-CSCF 108a.

Step 307

This step is seen in FIG. 3a. The S-CSCF 108b transmits a request for user profile to the HSS 108c. The HSS 108c receives the request for user profile from the S-CSCF 108b. The user profile is associated with a user of the UE 101 in which an application 102 may or may not be comprised.

Step 308

This step is seen in FIG. 3a. The HSS 108c transmits the requested user profile to the S-CSCF 108b. The S-CSCF 108b receives the user profile from the HSS 108c.

The IMS core network 108 treats the IMS registration as an initial registration, i.e. a registration of the UE 101 and/or the UE's application for the first time.

Step 309

This step is seen in FIG. 3b. The S-CSCF 108b transmits a 200 OK message to the I-CSCF 108a. The 200 OK message is associated with the registration in step 308. The 200 OK message may also be referred to as a message indicating successful registration.

Step 310

This step is seen in FIG. 3b. The S-CSCF 108b transmits a 3PP registration message to the TAS 108d. The TAS 108d receives the 3PP registration message from the S-CSCF 108b.

An IMS network may have multiple (T)AS from different vendors and these (T)AS provide different services. The UE 101 needs to register with each (T)AS to get their service. Since the (T)AS may be from different vendors, registrations to TAS are called 3PP registration.

Step 311

This step is seen in FIG. 3b. The TAS 108d transmits a request for user identify information to the HSS 108c. The HSS 108c receives the request for user identity information from the TAS 108d.

Step 312

This step is seen in FIG. 3b. The I-CSCF 108a transmits a 200 OK message to the P-CSCF 103. The 200 OK message indicates that the IMS registration of the UE 101 and/or the application comprised in the UE 101 has been successful.

The 200 OK message may also be referred to as a confirmation of successful registration.

Step 313

This step is seen in FIG. 3b. The HSS 108c transmits the requested user identity information to the TAS 108d. The TAS 108d receives the user identity information from the HSS 108c. The user identity is the identity of the user associated with the UE 101. The user identity may therefore also be referred to as UE identity.

Step 314

This step is seen in FIG. 3b. The TAS 108d transmits a 200 OK message to the S-CSCF 108b. The 200 OK message in step 314 indicates that the 3PP registration requested in step 310 has been successfully performed.

Step 315

This step is seen in FIG. 3b. The P-CSCF 103 transmits a 200 ok message to the UE 101. The 200 OK message in step 315 indicates to the UE 101 that its IMS registration request in step 303 has been successfully performed.

The method in FIGS. 3a and 3b describes that the UE 101, also referred to as a push client or comprising a push client, registers through a P-CSCF 103 with the IMS core network 108. During registration, the PNS server 113 stores the information used for Push notification from the registration signaling. The Auth. Server 115 and the HSS 108c is pre-provisioned with UE credentials to be used for authentication challenges.

FIG. 4a and FIG. 4b are signaling diagrams illustrating a method for IMS wake-up push. FIG. 4a illustrates steps 401-409 and FIG. 4b illustrates steps 410-414. FIG. 4b is a continuation of FIG. 4a such that steps 401-409 are first preformed, and then steps 410-414 are performed. At least one of the UE 101, the PNS server 113, the Auth. Server 115, the P-CSCF 103 and the IMS Core Network 108 participates in the method illustrated in FIGS. 4a and 4b. The IMS Core Network 108 may be represented by one or more core network nodes. Before step 401 is performed, the UE 101, the IMS Core Network 108 and the Auth. Server 115 are pre-provisioned with credentials associated with the UE 101. Also, before step 401 is performed, the UE 101 is in sleep mode and is detached from the IMS Core Network 108. In the methods shown in FIGS. 4a and 4b, re-registrations are not challenged by the IMS core network 108, which is a security risk.

The method illustrated in FIGS. 4a and 4b comprises at least one of the following steps, which steps are performed in any suitable order than described below:

Step 401

This step is seen in FIG. 4a. The P-CSCF 103 transmits an IMS Re-registration message to the IMS Core Network 108. The IMS Re-registration message may be a SIP registration message. The re-registration is a re-registration of the UE 101 in the IMS Core Network 108. The IMS Core Network 108 receives the IMS re-registration message from the P-CSCF 103.

Step 402

This step is seen in FIG. 4a. The IMS core network 108 transmits an IMS Re-Registration Challenge message to the P-CSCF 103. The IMS re-registration challenge message may be described as a SIP 401 message or to comprise SIP 401 information. The P-CSCF 103 receives the IMS re-registration challenge message from the IMS core network 108. 401 is a response code sent by the SIP Server, here represented by the core network node 508, where the SIP server challenges the SIP client to authenticate itself by providing further information i.e. password.

Step 403

This step is seen in FIG. 4a. The P-CSCF 103 may transmit a Hypertext Transfer Protocol (HTTP) request message to the PNS server 113. The HTTP request message may comprise the pre-provisioned credentials. The PNS server 113 receives the HTTP request message from the P-CSCF 103.

Step 404

This step is seen in FIG. 4a. The PNS server 113 may transmit a HTTP response message to the P-CSCF 103. The P-CSCF may receive the HTTP response message from the PNS server 113. The HTTP response message indicates to provide credentials.

Step 405

This step is seen in FIG. 4a. The P-CSCF 103 transmits an IMS Re-registration message to the IMS core network 108. The IMS re-registration message is for re-registration of the UE 101 in the IMS core network 108. The IMS re-registration message comprises SIP register information and credentials. The IMS core network 108 receives the IMS re-registration message from the P-CSCF 103. The re-registration is a registration of the UE 101 which is performed for the second or more times. The IMS core network 108 registers the UE 101, as requested.

Step 406

This step is seen in FIG. 4a. The IMS core network 108 transmits an IMS Re-registration Success message to the P-CSCF 103. The IMS re-registration success message indicates that the UE 101 has been successfully registered in the IMS core network 108. The IMS re-registration success message may comprise information indicating SIP 200OK.

Step 407

This step is seen in FIG. 4a. The IMS core network 108 transmits a terminating SIP invite session request message to the P-CSCF 103. The P-CSCF 103 receives the terminating SIP invite session request message from the IMS core network 108.

Step 408

This step is seen in FIG. 4a. The P-CSCF 103 transmits a push notification request message to the PNS server 113. The PNS server 113 receives the push notification request message from the P-CSCF 103.

Step 409

This step is seen in FIG. 4a. The PNS server 113 transmits a push notification to the UE 101. The push notification indicates to awake the sleeping UE 101. The UE 101 receives the push notification from the PNS server 113 and awakes, i.e. it's state changes from asleep to awake.

The UE 101 performs re-registration to the home IMS core network 108 in steps 410-414.

Step 410

This step is seen in FIG. 4b. The UE 101 transmits an IMS Registration message to the P-CSCF 103. The IMS registration message comprises push service information. The P-CSCF 103 receives the IMS registration message from the UE 101.

Step 411

This step is seen in FIG. 4b. The P-CSCF 103 transmits an IMS registration message to the IMS core network 108. The IMS core network 108 receives the IMS registration message from the P-CSCF 103. The IMS core network 108 registers the UE 101.

Step 412

This step is seen in FIG. 4b. The IMS core network 108 transmits an IMS registration success message to the P-CSCF 103. The IMS registration success message indicates that the registration of the UE 101 has been successfully performed. The P-CSCF 103 receives the IMS registration success message from the IMS core network 108.

Step 413

This step is seen in FIG. 4b. The P-CSCF 103 transmits an IMS registration success message to the UE 101. The IMS registration success message indicates that the registration of the UE 101 has been successfully performed. The UE 101 receives the IMS registration success message from the P-CSCF 103.

Step 414

This step is seen in FIG. 4b. The P-CSCF 103 transmits a terminating SIP session request message to the UE 101. The UE 101 receives the terminating SIP session request message from the P-CSCF 103. The UE 101 terminates its SIP session, as requested.

Therefore, there is a need to at least mitigate or solve this issue.

SUMMARY

An objective of embodiments herein is therefore to obviate at least one of the above disadvantages and to provide improved handling of state change of a communication link in in a communications network.

According to a first aspect, the object is achieved by a method performed by a first communication node for handling state change of a communication link in a communications network. The first communication node subscribes to state information indicating a state change of a communication link between a UE and a second communication node. The first communication node obtains, from the second communications node, the state information indicating the state change.

According to a second aspect, the object is achieved by a method performed by a second communication node for handling state change of a communication link in a communications network. The second communication node obtains, from a first communication node, a subscription to state information indicating a state change of the communication link between the UE and the second communication node. The second communication node detects that a state of the communication link has changed from a connected state to a disconnected state or from the disconnected state to the connected state. The second communication node provides, to the first communications node, the state information indicating the state change.

According to a third aspect, the object is achieved by a first communication node for handling state change of a communication link in a communications network. The first communication node is adapted to subscribe to state information indicating a state change of a communication link between a UE and a second communication node. The first communication node is adapted to obtain, from the second communications node, the state information indicating the state change.

According to a fourth aspect, the object is achieved by a second communication node for handling state change of a communication link in a communications network. The second communication node is adapted to obtain, from a first communication node, a subscription to state information indicating a state change of the communication link between the UE and the second communication node. The second communication node is adapted to detect that a state of the communication link has changed from a connected state to a disconnected state or from the disconnected state to the connected state. The second communication node is adapted to provide, to the first communications node, the state information indicating the state change.

Since the first communication node subscribes to the state information indicating the state change, it keeps track of the state of the communication link between the second communication node and the UE on behalf of the UE, and also handles the registration and de-registration of the UE on behalf of the UE, the handling of state change of a communication link in a communications network is improved. When the first communication node obtains information indicating a state change such as e.g. disconnection, it automatically triggers de-registration of the UE from core network node.

Embodiments herein afford many advantages, of which a non-exhaustive list of examples follows:

An advantage of the embodiments herein is that they provide significant improvement in the battery resource of the UE, i.e. the less the push notification, the more battery life for the UE.

Another advantage of the embodiments herein is that they are platform, i.e. operating system, agnostic i.e. independent of the operating system used by the UE.

A further advantage of the embodiments herein is that they can be controlled more on the core network.

An advantage of the embodiments herein is that the (automatic) de-registration procedure de-registers the UE faster from IMS core network than the current architecture.

Another advantage of the embodiments herein is that there is no need of any new implementation in the UE.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which:

FIG. 9a is a schematic drawing illustrating a first communication node.

FIG. 9b is a schematic drawing illustrating a first communication node.

The drawings are not necessarily to scale and the dimensions of certain features may have been exaggerated for the sake of clarity. Emphasis is instead placed upon illustrating the principle of the embodiments herein.

DETAILED DESCRIPTION

Figure 5:
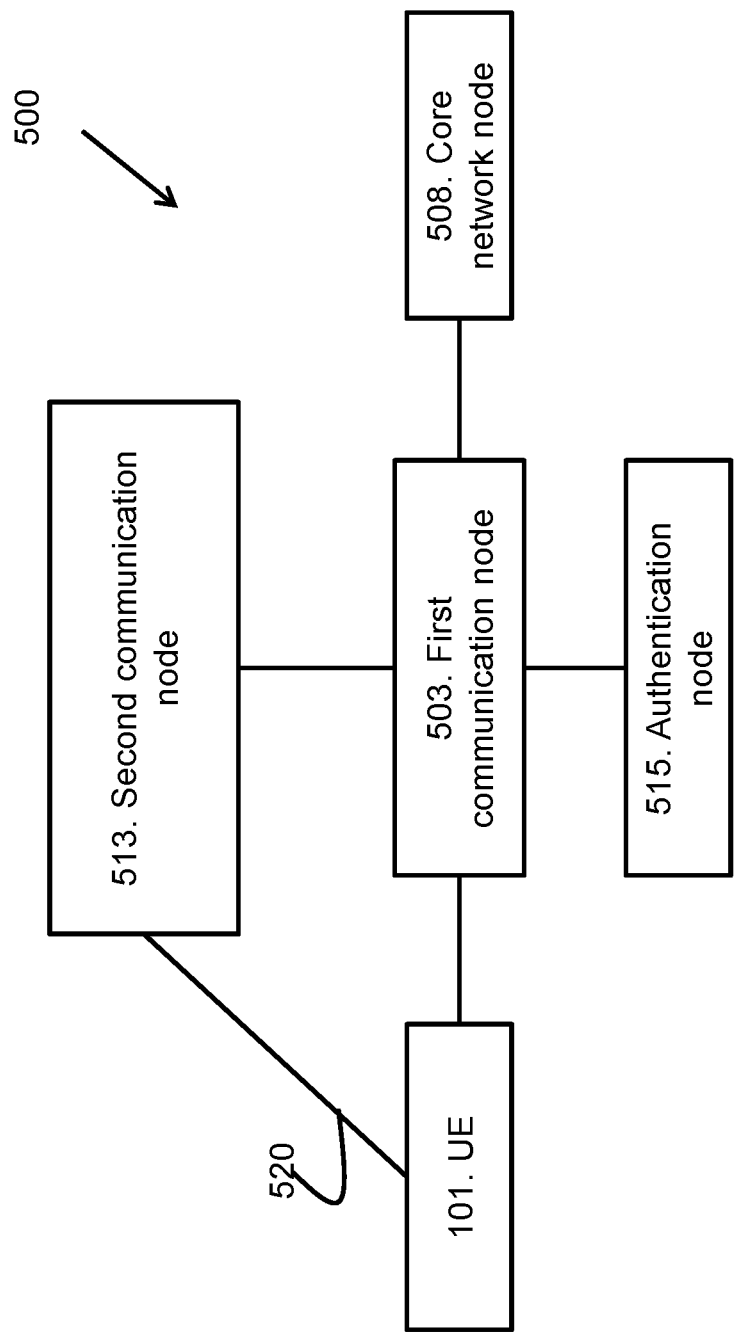
FIG. 5 is a schematic block diagram illustrating a communications network.

FIG. 5 depicts a communications network 500 in which the embodiments herein may be implemented. The communications network 500 may be a wireless communications system, sometimes also referred to as a wireless communications network, cellular radio system, or cellular network. The communications network 500 may be a 2G, 3G, 4G, 5G, 6G system, 5G network, NR-U or Next Gen system or network. The communications network 500 may alternatively be a younger system than a 5G system. The communications network 500 may support other technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, NB-IoT.

The communications network 500 comprises one or a plurality of UEs 101. FIG. 5 shows one UE 101 for the sake of simplicity. The UE 101 may be a push client, it may comprise a push client or it may be adapted to perform a push function. The UE 101 may also be referred to simply as a device. The UE 101, e.g. a LTE UE or a 5G/NR UE, may be a wireless communication device which may also be known as e.g., a wireless device, a mobile terminal, wireless terminal and/or mobile station, a mobile telephone, cellular telephone, or laptop with wireless capability, just to mention some further examples. The UE 101 may be a device by which a subscriber may access services offered by an operator's network and services outside operator's network to which the operator's radio access network and core network provide access, e.g. access to the Internet. The UE 101 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device, Internet of Things (IOT) device, terminal device, communication device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE, a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system.

The UE 101 may comprise zero, one or more applications (app). An app may be described as a computer software or a computer program.

The UE 101 is enabled to communicate wirelessly or via wire within the communications network 100. The communication may be performed e.g. between two devices, between a devices and a regular telephone, between the UE 101 and a network node, between network nodes, and/or between the devices and a server via the radio access network and possibly one or more core networks and possibly the internet.

The communications network 100 comprises communication nodes, whereof a first communication node 503 and a second communication node 513 are depicted in FIG. 5. 2. The first communication node 503 is adapted to communicate with the UE 101 and the second communication node 513. The first communication node 503 may be a server, a proxy, a proxy server, a CSCF node, a P-CSCF node or a node implementing a network edge function.

The second communication node 513 is adapted to communicate with the UE 101 via a communications link 520. The second communication node 513 is adapted to communicate with the first communication node 503. The second communication node 513 may be a PNS server, a PNS node, a node implementing a push notification function, a push notification node etc. The communications link 520 may be a wired or wireless link, and may use any suitable protocol depending on type and level of layer, e.g. as indicated by the Open Systems Interconnection (OSI) model.

The communications network 500 comprises a core network node 508. The core network node may be an I-CSCF, HSS, TAS etc. The core network node 508 is adapted to communicate with the first communication node 503. The core network node 508 may be referred to as an IMS core network node.

The communications network 500 comprises an authentication node 515. The authentication node 515 may be described as an authentication server, a node adapted to perform an authentication function. The authentication node 515 is adapted to handle authentication of a UE 101 and/or an application comprised in the UE 101 that tries to access at least a part of the communications network 500. The authentication node 515 is adapted to communicate with the first communication node 503.

The communications network 500 may comprise other nodes in addition to the ones illustrated in FIG. 5, such as e.g. an access node, such as a radio base station, or any other network node with similar features capable of serving the UE.

The communications network 100 covers a geographical area which may be divided into cell areas, wherein each cell area may be served by a access node, although, one network node may serve one or several cells. A cell is a geographical area where radio coverage is provided by the access node at a access node site. Each cell is identified by an identity within the local access node area, which is broadcast in the cell. The access node may be of different classes, such as, e.g., macro base station (BS), home BS or pico BS, based on transmission power and thereby also cell size. The access node may be directly connected to one or more core networks, which are represented by the core network node 508 in FIG. 5. The access node may be a distributed node, such as a virtual node in the cloud, and it may perform its functions entirely on the cloud, or partially, in collaboration with another access node.

It should be noted that the communication links in the communications network 100 may be of any suitable kind including either a wired or wireless link. The links may use any suitable protocol depending on type and level of layer, e.g. as indicated by the OSI model.

Figure 6A:
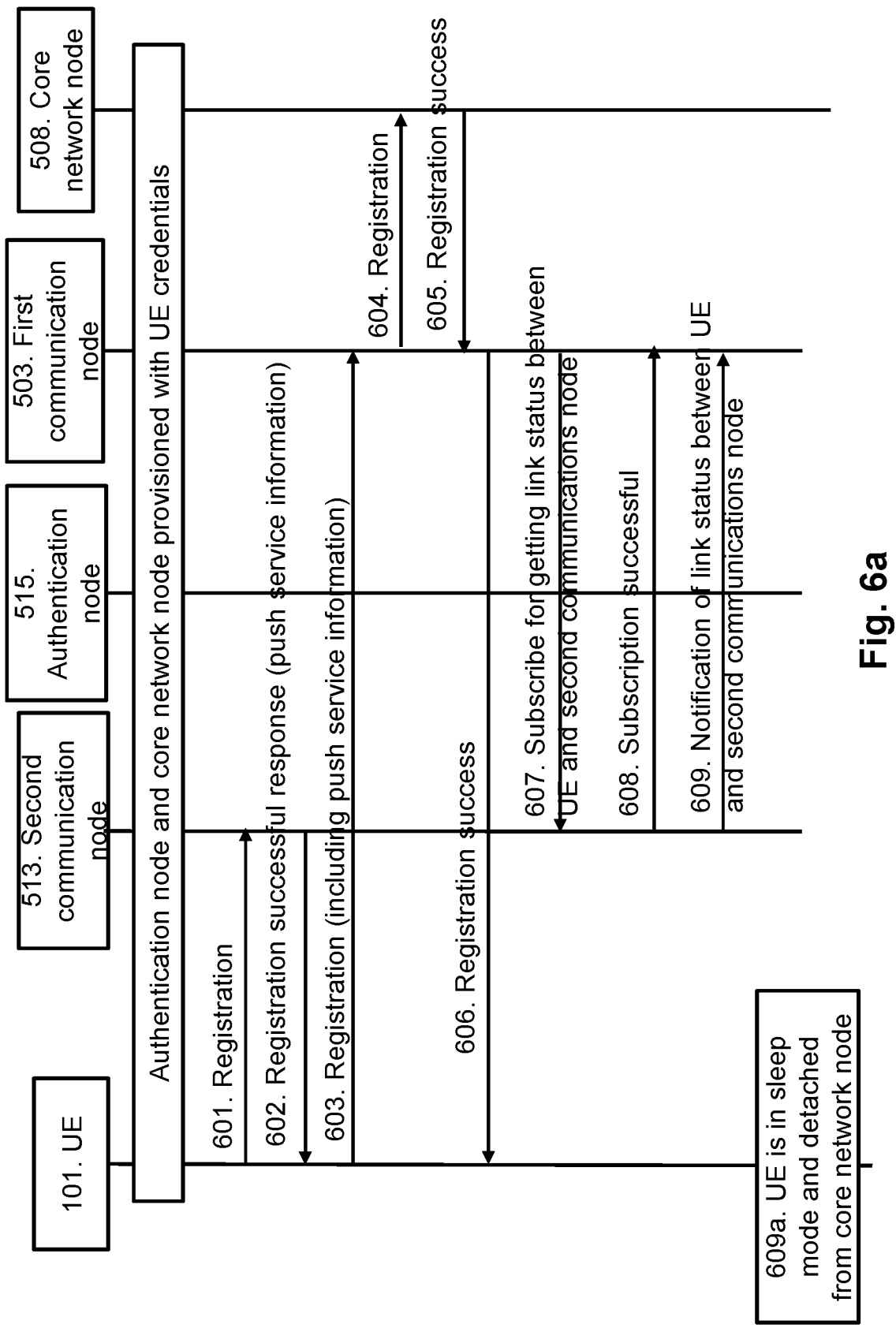
FIGS. 6a-6d are signaling diagrams illustrating a method.
Figure 6B:
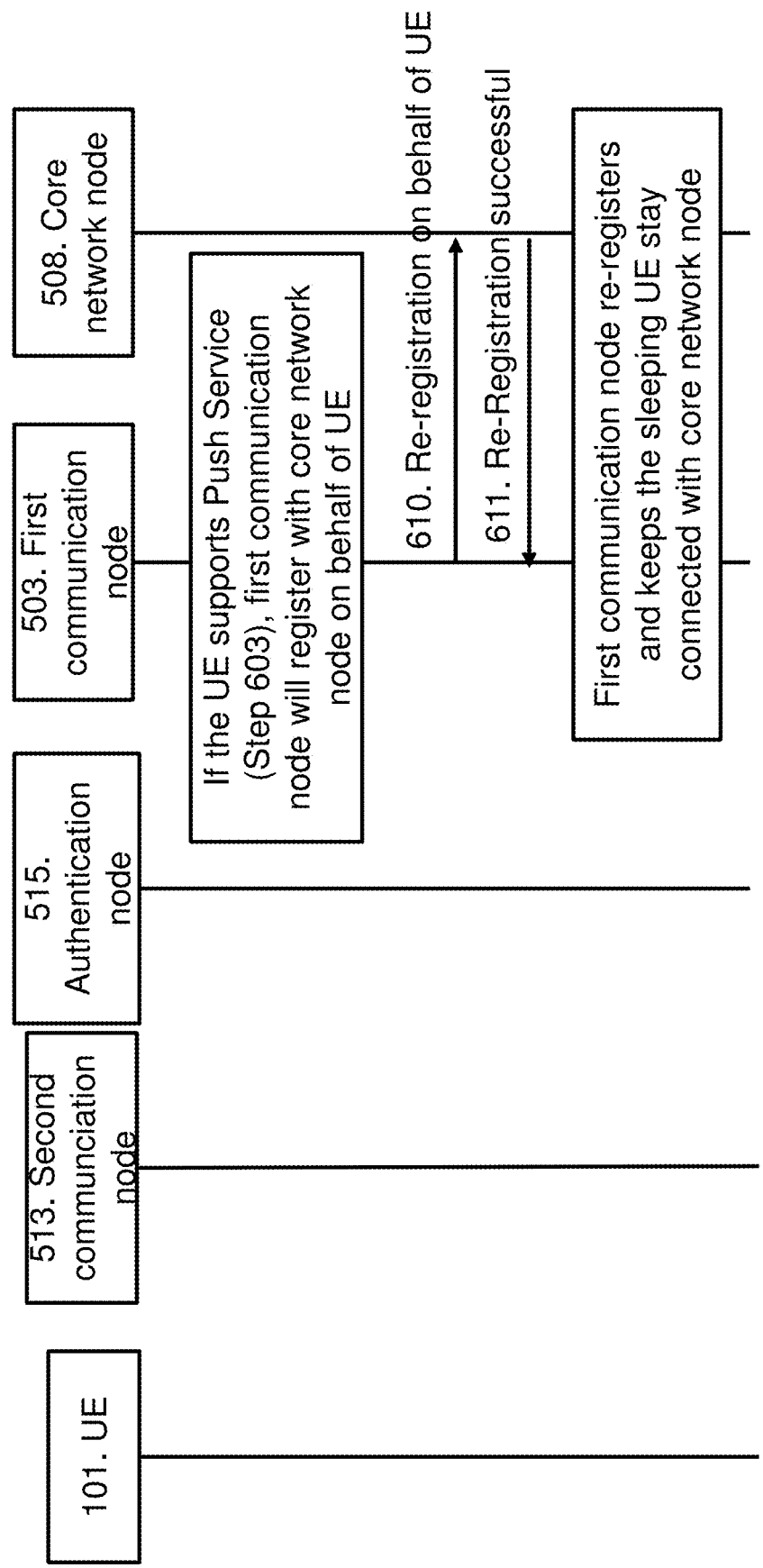
Figure 6C:
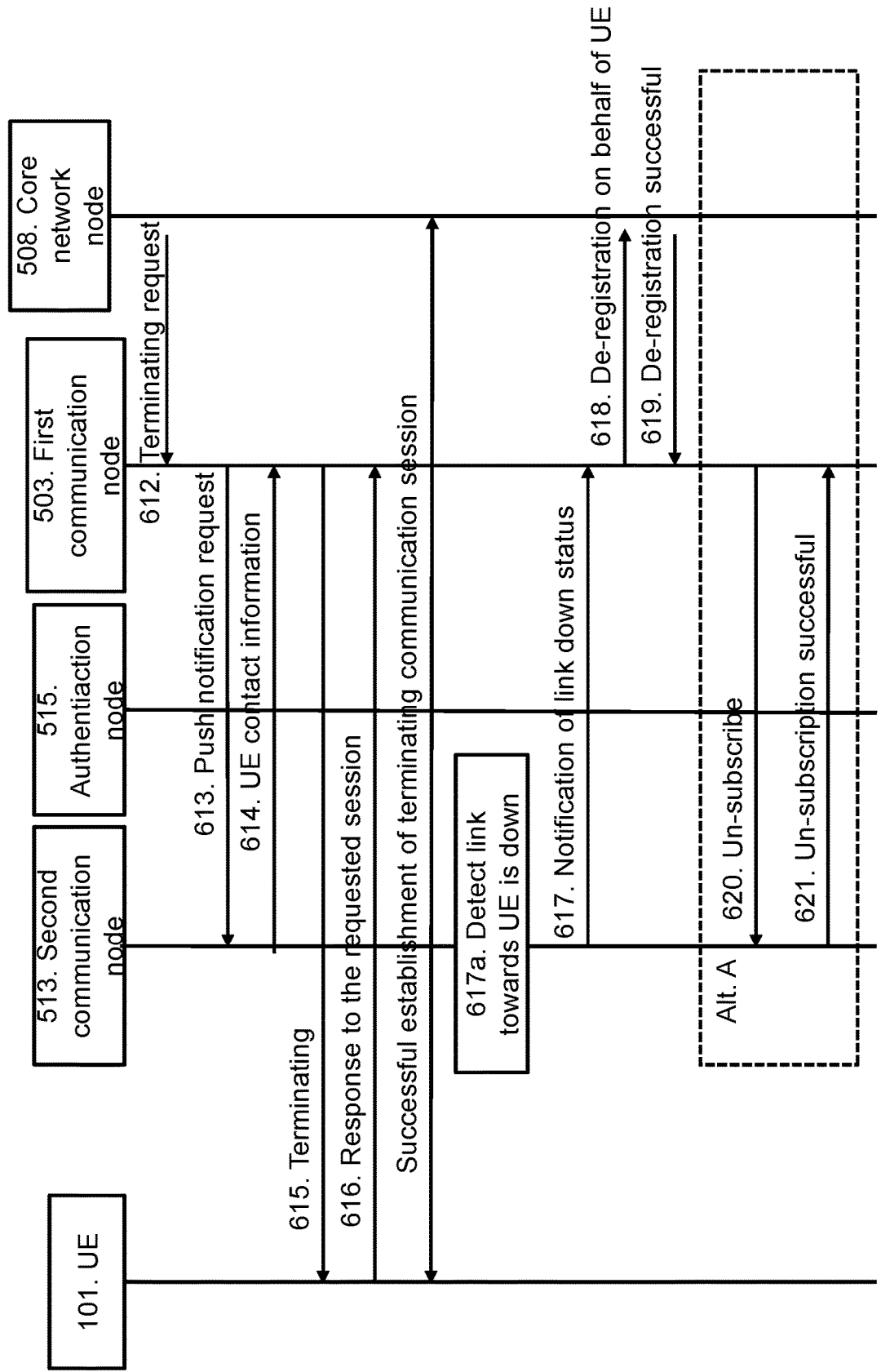
Figure 6D:
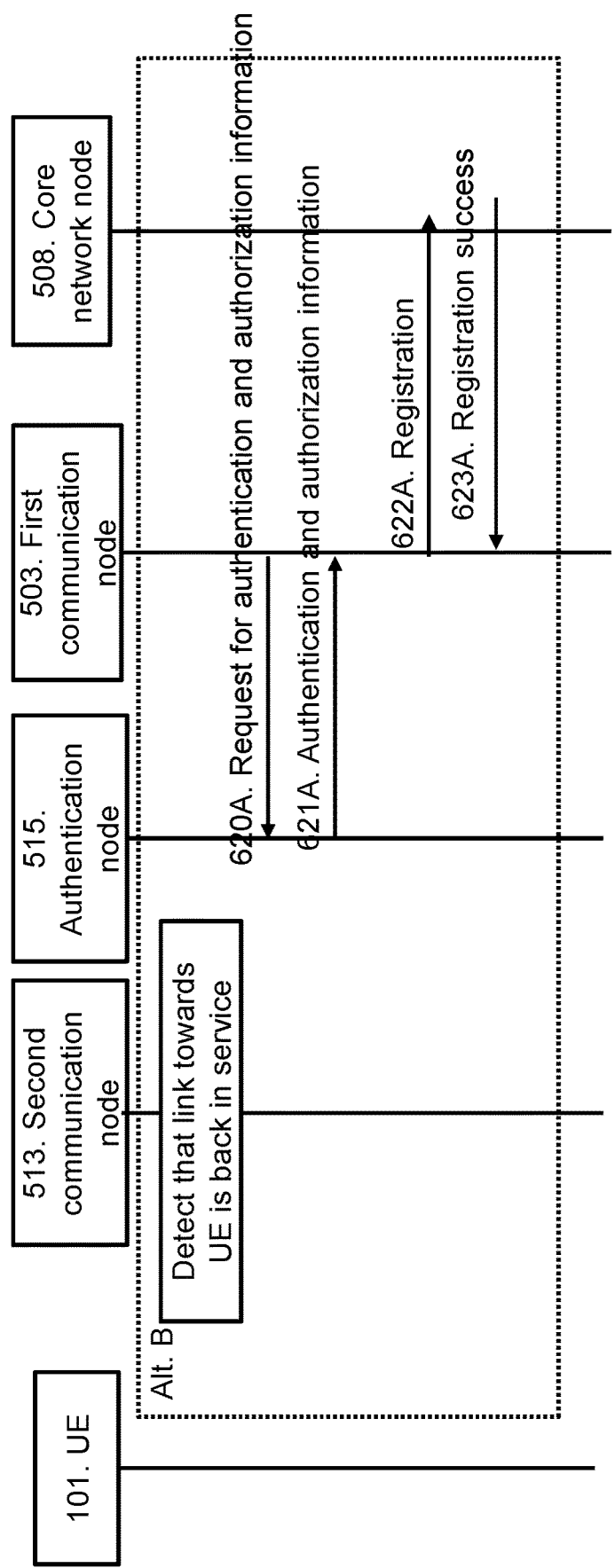

FIGS. 6*a*, 6*b*, 6*c* and 6*d* are signalling diagrams illustrating a method. FIG. 6*a* illustrates steps 601-609, FIG. 6*b* illustrates steps 610-11, FIG. 6*c* illustrates steps 612-621 and FIG. 6*d* illustrates steps 620A-623A. The steps of FIG. 6*b* are performed after the steps of 6*a*. At least some of the steps of FIG. 6*c* are preformed after the steps of FIG. 6*b*. The steps of FIG. 6*c* may be performed after at least some of the steps of FIG. 6*c*. Steps 617*a*-621 of FIG. 6*c* may be an alternative to steps 622-625 of FIG. 6*d*. Steps 617*a*-621 of FIG. 6*c* may be performed instead of steps 620A-623A of FIG. 6*d*, or steps 620A-23A of FIG. 6*d* may be performed instead of steps 617*a*-621 of FIG. 6*c*. Steps 617*a*-621 are indicated as alt. A in FIG. 6*c*, and steps 620A-623A are indicated as alt. B in FIG. 6*d*.

Summarized, FIGS. 6*a*-6*d* describes a signalling scenario where the first communication node 503 gets subscribed to a service provided by the second communication node 513. Using other words, FIGS. 6*a*-6*d* describes a platform agnostic re-registration and auto-deregistration of the UE 101. The service provided by the second communication node 513 may be a push notification service. The first communication node 503 gets subscribed to a service provided by the second communication node 513 to avail a Push-link-status service to keep track of the status of the communications link 520 between second communications node 513 and the UE 101, and then keeps the registration of UE intact with the core network node 508 on behalf of the UE 101.

Before the first step of FIG. 6*a* is performed, the UE 101 has been already registered with the core network node 508 via the current first communication node 503 and indicated its support for push notification in the initial/previous registration message, e.g. a SIP registration message. The authentication node 515 and the core network node 058 are pre-provisioned with UE credentials to be used for authentication, e.g. authentication of the UE 101. The UE 101 is in sleep mode when step 601 is performed. The UE credentials may be subscription information, access information, etc. and are used for enabling authentication.

The method illustrated in FIGS. 6*a*-6*d* comprises at least one of the following steps, which steps may be performed in any suitable order than described below:

Step 601

Figure 1:
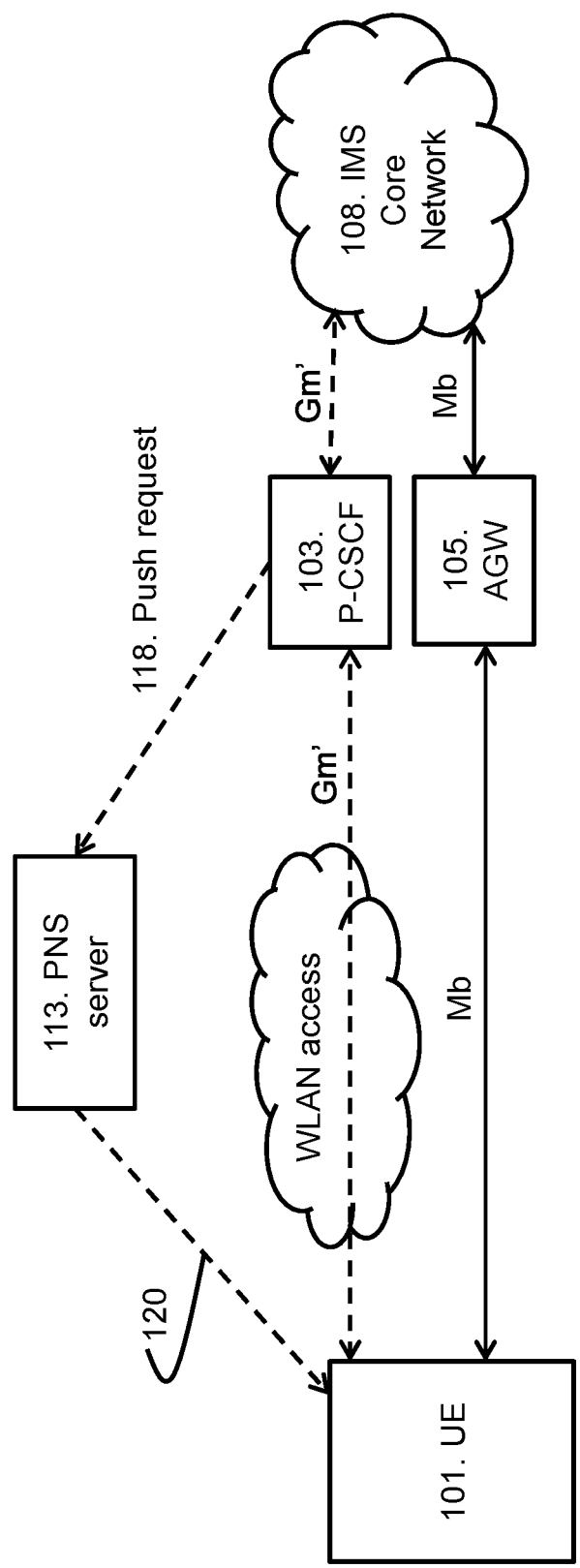
FIG. 1 is a schematic diagram illustrating a communications network.
Figure 2:
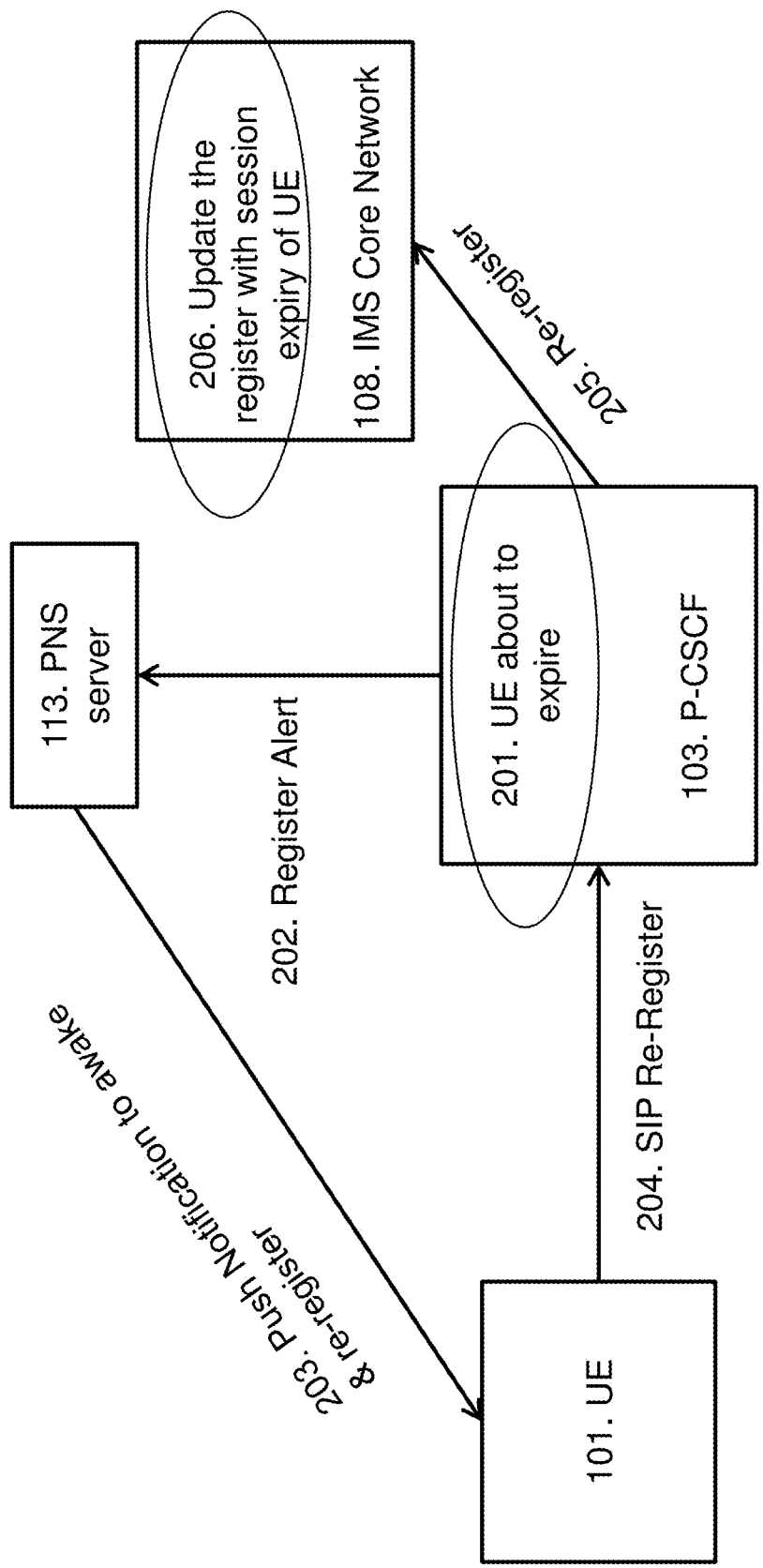
FIG. 2 is a schematic diagram illustrating a push based wake-up solution blocked by the UE's OS.
Figure 3A:
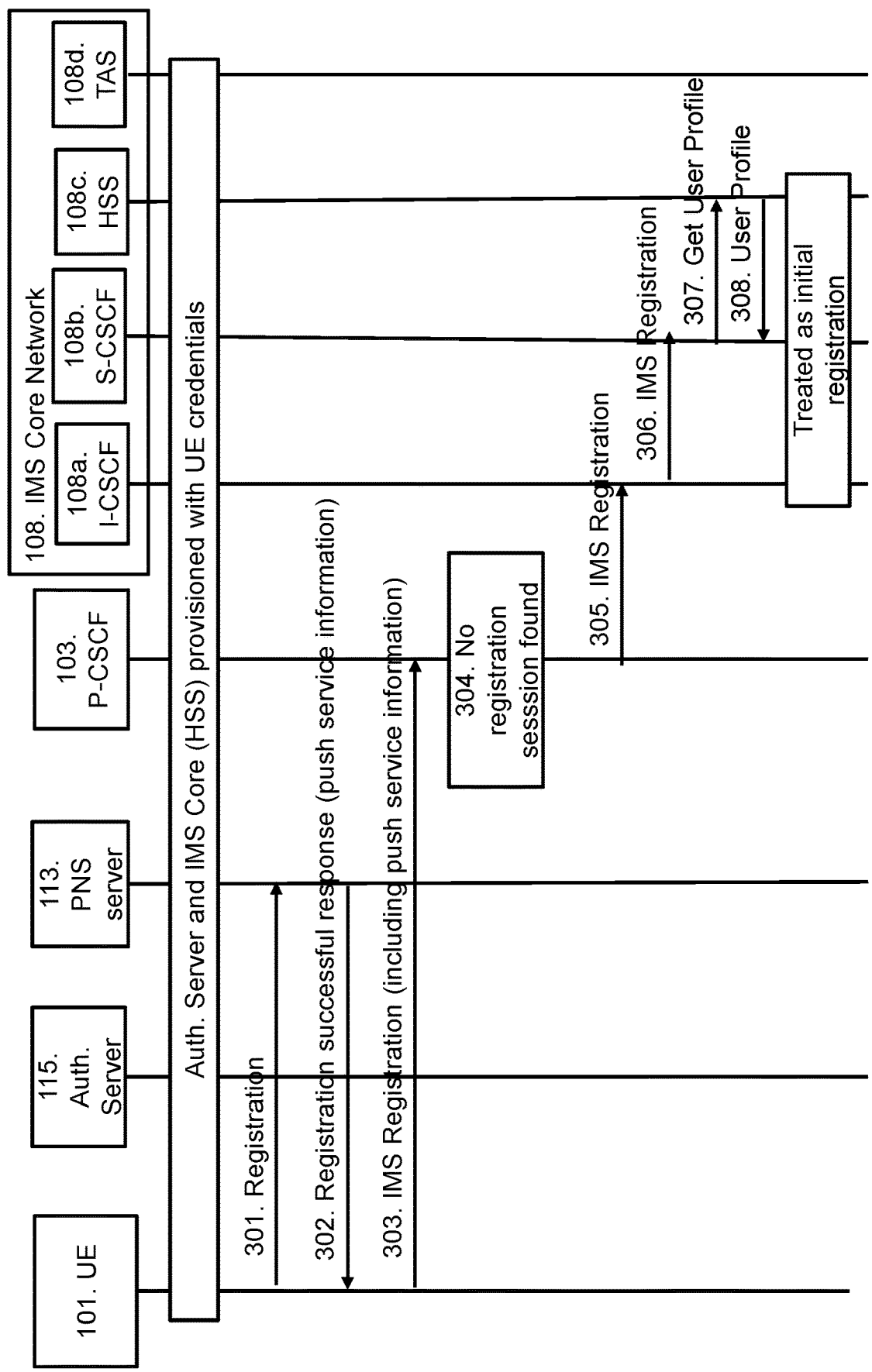
FIGS. 3a-3b are signaling diagrams illustrating a current method for initial registration of a UE comprising a push client.
Figure 3B:
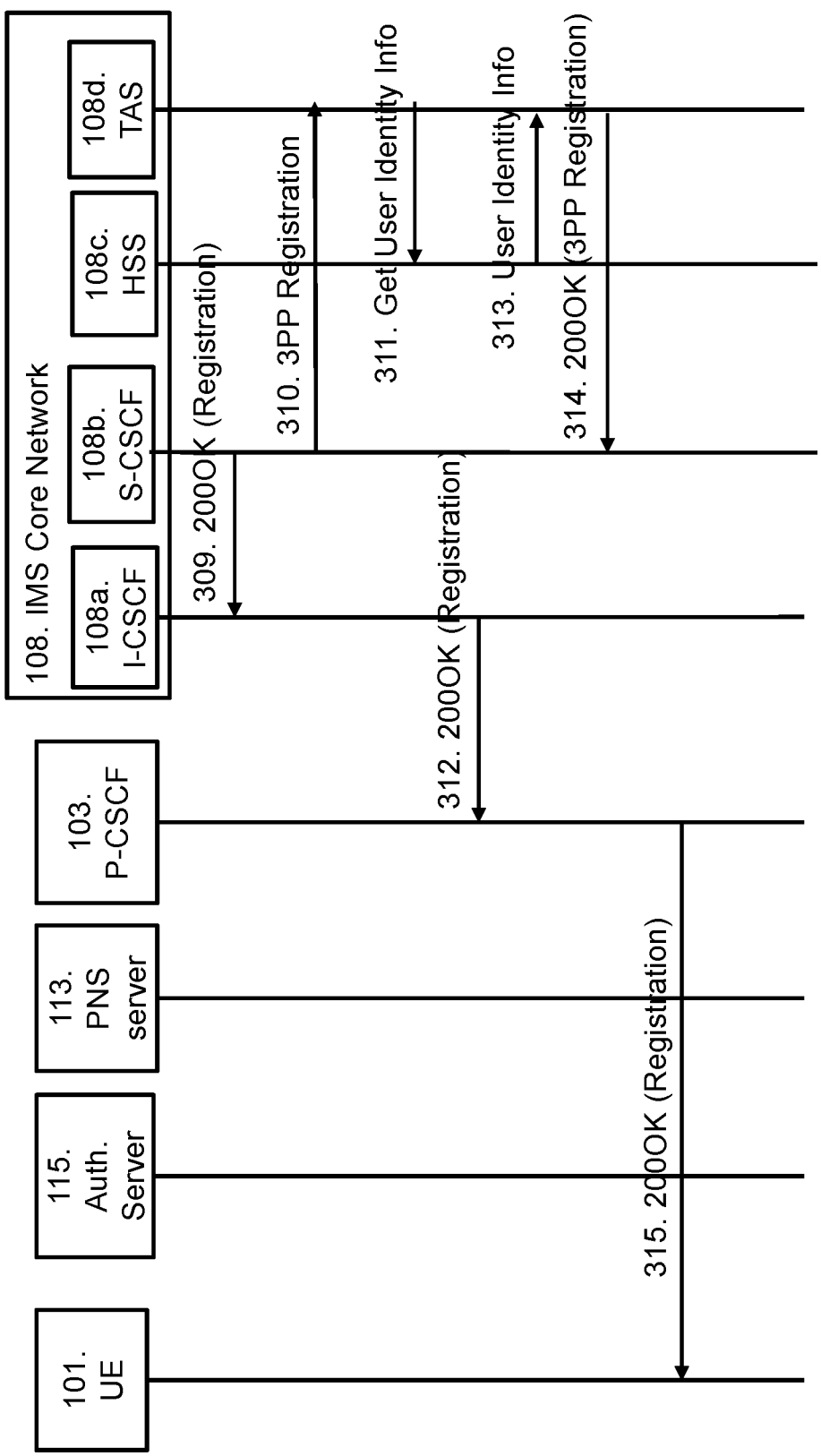

This step is seen in FIG. 6*a*. This step is the same as step 310 in FIG. 3*a*. The UE 101 transmits a registration message to the second communications node 513. The registration message indicates registration of the UE 101 in the second communications node 513. The second communications node 513 receives the registration from the UE 101, and registers the UE 101.

As mentioned earlier, the UE 101 may comprise one or more applications, and the registration message may be associated with registration of an application instead or in addition to registration of the UE 101. The registration message may be a Sip registration message.

In this step, the UE 101 gets registered to the PNS to avail the PNS for (future) incoming terminating requests from the core network node 508 when the UE 101 is in sleep mode.

Step 602

This step is seen in FIG. 6*a*. This step corresponds to step 302 in FIG. 3*a*. The second communications node 513 transmits a response message to the UE 101, and the response message may be a registration successful message. This message may be sent after the second communications node 513 has successfully registered the UE 101 and/or successfully registered the application comprised in the UE 101. The message comprises push service information. The push service information may be a Push Resource ID (PRID). The push service information may also be referred to as push notification parameters or push notification information.

In this step, the second communication node 513 responds with successful push notification registration and provides the PRID back to the UE 101. The response message Step 603

This step is seen in FIG. 6*a*. This step corresponds to step 303 in FIG. 3*a*. The UE 101 transmits a registration message to the first communications node 503. The registration message may be an IMS registration message. The registration message comprises the push service information that the UE 101 is received in step 602. The registration message indicates that the first communication node 503 should register the UE 101 in the core network, e.g. a core network node 508. The first communications node 503 receives the registration message from the UE 101.

Instead of or in addition to that the registration message indicates registration of the UE 101, the registration message may indicate registration of one or more applications comprised in the UE 101. The registration message may be an initiation registration message.

In this step, the UE 101 sends an initial SIP register request towards the first communication node 503 along with at least some of the push notification parameters, e.g. PRID, provided by the second communication node 513 in step 602.

Step 604

This step is seen in FIG. 6*a*. The first communication node 503 sends a registration message to the core network node 508. The registration message may be an IMS registration message. The core network node 508 receives the registration message from the first communication node 503, and registers the UE 101. The registration message is a request for registration of the UE 101 in the core network node 508. This may also be described as the first communication node 503 forwards the registration message from step 603 to the core network node 508.

In this step, the first communication node 503 forwards the incoming initial registration request message to the core network node 508.

Step 605

This step is seen in FIG. 6*a*. The core network node 508 sends a registration success message to the first communication node 503. The first communication node 503 receives the registration success message from the core network node 508. The registration success message indicates that the UE 101 has successfully been registered by the core network node 508. The registration success message may be an IMS registration success message.

In this step, the core network node 508 verifies the registration request message and a corresponding subscriber profile and responds with a successful registration back to the first communication node 503. The corresponding subscriber profile is for the UE 101 which has been registered. The subscriber profile may comprise subscriber information of the subscriber of the UE 101.

Step 606

This message is seen in FIG. 6a. The first communication node 503 sends a registration success message to the UE 101. This step may also be described as the first communication node 503 forward the registration success message to the UE 101. The registration success message may be an IMS registration success message. The registration success message indicates that the UE 101 has successfully been registered at the core network node 508. The UE 101 receives the registration success message from the first communication node 503.

In this step, the successful response of the registration request is forwarded back to the UE 101 by the first communication node 503.

Step 607

This step is seen in FIG. 6a. The first communication node 503 sends, to the second communication node 513, a request for subscription to link status of the communication link 520 between the UE 101 and the second communications node 513. The second communication node 513 receives the request from the first communication node 503.

Using other words, the first communication node 503 subscribes to the push link status service with the second communication node 513 so that the second communication node 513 will notify the first communication node 503 in case the status of the communication link 520 between UE 101 and the second communication node 503 changes.

Step 608

This step is seen in FIG. 6a. The second communication node 513 sends a subscription successful message to the first communication node 503. The first communication node 503 receives the subscription successful message from the second communication node 513. The subscription successful message indicates that the subscription request in step 607 has been successfully registered by the second communication node 513.

In this step, the second communication node 513 accepts the subscription and sends a successful response for the subscription to the first communication node 503.

Step 609

This step is seen in FIG. 6a. The second communication node 513 sends, to the first communication node 503, a notification of link status of the communication link 520 between the UE 101 and the second communications node 513. The first communication node 503 receives the notification from the second communication node 513. The link status may be either that the communication link 520 is connected or disconnected. The notification of the link status may be sent when the second communication node 513 has detected a change in then link status. The notification of link status may be sent upon request, e.g. from the first communication node 503. In this step, the first communication node 503 receives a notification from the second communication node 513 informing about a change of the link status of the interface between the second communication node 513 and the UE 101.

Step 609a

This step is seen in FIG. 6a. The UE 101 is in sleep mode and detached from the core network node 508, e.g. detached from the IMS network.

If the UE 101 supports push service (Step 603), the first communication node 503 will register with the core network node 508 on behalf of the UE 101.

The first communication node 503 may re-verify if the UE supports the push mechanism by verifying the registration parameters, e.g. PRID, sent by the UE 101 in step 603.

From here on, the first communication node 503 may trigger periodic re-registration towards core network node 508 on behalf of the UE 101. The UE 101 no longer needs to be woken up by sending a push notification to trigger re-registration. Not waking up for re-registration, significantly improves the battery resource of the UE 101.

Step 610

This step is seen in FIG. 6b. The first communication node 503 sends, to the core network node 508, re-registration on behalf of the UE 101. The core network node 508 receives the re-registration from the first communication node 503. The core network node 508 re-registers the UE 101.

Step 611

This step is seen in FIG. 6b. The core network node 508 sends a re-registration successful message to the first communication node 503. The first communication node 503 receives re-registration successful message from the core network node 508. The re-registration successful message indicates that the UE 101 has been successfully re-registered by the core network node 508. Re-registration indicates a registration for the second more times, i.e. the 101 has previously been registered by the core network node 508 and is now re-registered at another time.

First communication node 503 re-registers and keeps the sleeping UE 101 stays connected with core network node 508.

In steps 610-511, the core network node 508 receives re-registration and sends successful response back to the first communication node 503. The first communication node 503 may not forward the successful response to any other node including second communication node 513 and the UE 101.

Step 612

This step is seen in FIG. 6c. The core network node 508 sends a terminating request message to the first communication node 503. The first communication node 503 receives the terminating request message from the core network node 508. The terminating request message indicates termination of a communication session associated with the UE 101. The terminating request message may be a terminating SIP request message. The communication session may be a phone call, a data communication etc.

In this step, the core network node 508 forwards a terminating request to the first communication node 503 intended for the UE 101.

Step 613

This step is seen in FIG. 6c. The first communication node 503 sends a push notification request message to the second communication node 513. The push notification request message indicates to get contact information of the UE 101. The push notification request message comprises PN parameters. The second communication node 513 receives the push notification request message from the first communication node 503.

In this step, the first communication node 503 triggers push notification towards the second communication node 513 by providing the PRID of the UE 101 for the latest contact information of the UE 101 for which the terminating request is destined for.

Step 614

This step is seen in FIG. 6c. The second communication node 513 sends, to the first communication node 503, the contact information associated with the UE 101. The first communication node 503 receives the contact information from the second communication node 513.

In this step, the second communication node 513 responds the request in step 613 to the first communication node 503 by providing the latest contact information of the UE 101.

Step 615

This step is seen in FIG. 6c. The first communication node 503 forwards the terminating request from step 612 to the UE 101. The UE 101 receives the terminating request from the first communication node 503. The UE 101 terminates the session, as requested.

The first communication node 503 forwards the awaiting terminating request to the UE 101 using the contact information received from second communication node 513 in the previous step, i.e. step 614.

Step 616

This step is seen in FIG. 6c. The UE 101 sends, to the first communication node 503, a response message to the requested session. The first communication node 503 receives the response from the UE 101.

In this step, the UE 101 receives the request and sends a successful response back to the first communication node 503.

The communication session gets established successfully and the UE 101 communicates with the calling party, e.g. another UE 101, successfully. The media session can be hung up by either of the UEs 101.

Step 617a

This step is seen in FIG. 6c. The second communication node 513 detects that the communication link 520 between itself and the UE 101 is down.

Step 617

This step is seen in FIG. 6c. The second communication node 513 sends a notification of the down status to the first communication node 503. The first communication node 503 receives the notification from the second communication node 513. The notification is a result of the subscription in step 607.

In steps 617a and 617, the second communication node 513 detects that the interface between the UE 101 and itself is broken down, and that the second communication node 513 can no longer contact the UE 101 either the UE 101 was shut down or the UE 101 was killed or for any other reasons. The second communication node 513 informs the current link (between the UE 101 and second communication node 513) down status to the first communication node 503 by sending a notification to the first communication node 503.

Step 618

This step is seen in FIG. 6c. Upon receipt of the notification of the down status, the first communication node 503 sends a request for de-registration to the core network node 508. The de-registration is on behalf of the UE 101. The core network node 508 receives the request for de-registration from the first communication node 503. The core network node 508 de-registers the UE 101.

The first communication node 503 may wait to perform step 618 until a grace period expires. If the second communication node 513 informs that the communication link 520 has come back to service within the grace period, then the first communication node 503 may continue to trigger re-register on behalf of the UE 101. However, on expiry of the grace period, the first communication node 503 may automatically trigger de-registration of the UE 101 to the core network node 508. The grace period may also be referred to as a grace interval, a time period, a time range etc.

Step 619

This step is seen in FIG. 6c. The core network node 508 sends a de-registration successful message to the first communication node 503. The de-registration successful message indicates that the UE 101 has been successfully de-registered by the core network node 508.

In this step, the core network node 508 removes the UE 101, e.g. the subscriber of the UE 101, from and responds back to the first communication node 503 with a successful de-registration message.

There are two alternatives A and B. Steps 620 and 621 may be seen as being comprised alternative A, as indicated with a dotted box in FIG. 6c.

Step 620

This step is seen in FIG. 6c and is part of alternative A. The first communication node 503 sends, to the second communication node 513, an un-subscribe message for unsubscribing of the service of getting a link status between the UE and second communication node 513. The second communication node 513 receives the un-subscribe message from the first communication node 503. The second communication node 513 un-subscribes the service of getting link status.

On receiving the de-registration response from core network node 508, the first communication node 503 may unsubscribes the push link status service for that specific UE 101 from the second communication node 513.

Step 621

This step is seen in FIG. 6c and is part of alternative A. The second communication node 513 sends a un-subscription successful message to the first communication node 503. The un-subscription successful message indicates that the un-subscription has been successfully performed.

In this step, the second communication node 513 may acknowledges the un-subscription by responding to the first communication node 503 with a successful un-subscription message.

Steps 620A-623A may be described as being alternative B, as indicated with the dotted box in FIG. 6d. Alternative B may be an alternative to alternative A in FIG. 6c. In alternative B, the first communication node 503 may never unsubscribes the push link status service from the second communication node 513.

Step 620A

This step is seen in FIG. 6d. The second communication node 513 detects that the communication link 520 between the UE 101 and the second communication node 513 is back in service, i.e. that it's status has changed from disconnected to connected.

The first communication node 503 sends a request for authentication and authorization information to the authentication node 515. This step may be described as the first communication node 503 retrieves authentication and authorization information from the authentication node 515. The authentication node 515 receives the request from the first communication node 503.

In this step, the push link status service detects that the communication link 520 between the UE 101 and the second communication node 513 is back in service. The first communication node 503 triggers a request to the authentication node 515 seeking required keys and attribute values for authentication and authorization into the core network node 508 that has been pre-provisioned in the authentication node 515.

Step 621A

This step is seen in FIG. 6d. The authentication node 515 sends authentication and authorization information to access the core network, e.g. the core network node 508, to the first communication node 503.

The authentication node 515 sends back a successful response to the first communication node 503 comprising at least some of the keys/attributes requested by the first communication node 503.

Step 622A

This step is seen in FIG. 6d. The first communication node 503 sends a registration message to the core network node 508. The core network node 508 receives the registration message from the first communication node 503. The core network node 508 registers the UE 101 associated with the registration message. The registration message is a request for registration of the UE 101 at the core network node 508. The registration is a first, second or more times registration of the UE 101. The registration message may be an IMS registration message.

In this step, the first communication node 503 initiates an initial registration towards the core network node 508 on behalf of the UE 101, e.g. by sending a registration message to the core network node 508. The registration may be an initial registration.

Step 623A

This step is seen in FIG. 6d. The core network node 508 sends a registration success message to the first communication node 503. The first communication node 503 receives the registration success message from the core network node 508. The registration success message indicates that the UE 101 has been successfully registered at the core network node 508. The registration success message may be an IMS registration success message.

In this step, the core network node 508 verifies the registration keys and sends back a successful registration response to the first communication node 503. From here on, the UE 101 may receive terminating requests irrespective of its state i.e. sleep or awake state.

In alternative A, un-subscription of the service will take place. In alternative B, the state-information service won't be unsubscribed from the second communication node 513. When the second communication node 513 notifies that the communication link 520 is up, i.e. connected, the first communication node 503 may trigger an automatic "Initial" registration, on behalf of the UE 101, towards the core network node 508. The timer may or may not be started in alternative B.

Figure 4A:
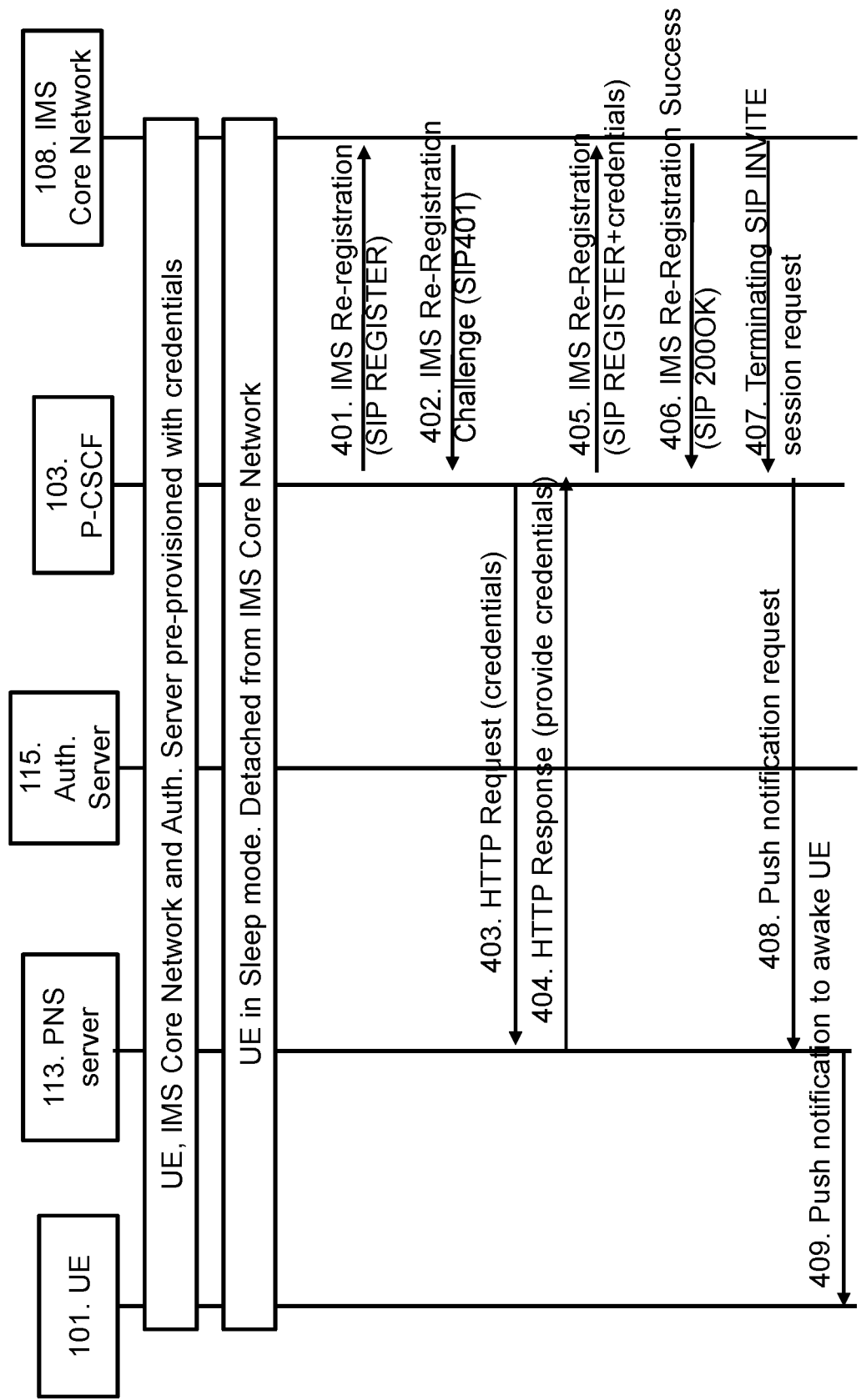
FIGS. 4a-4b are signaling diagrams illustrating an IMS wake-up push method.
Figure 4B:
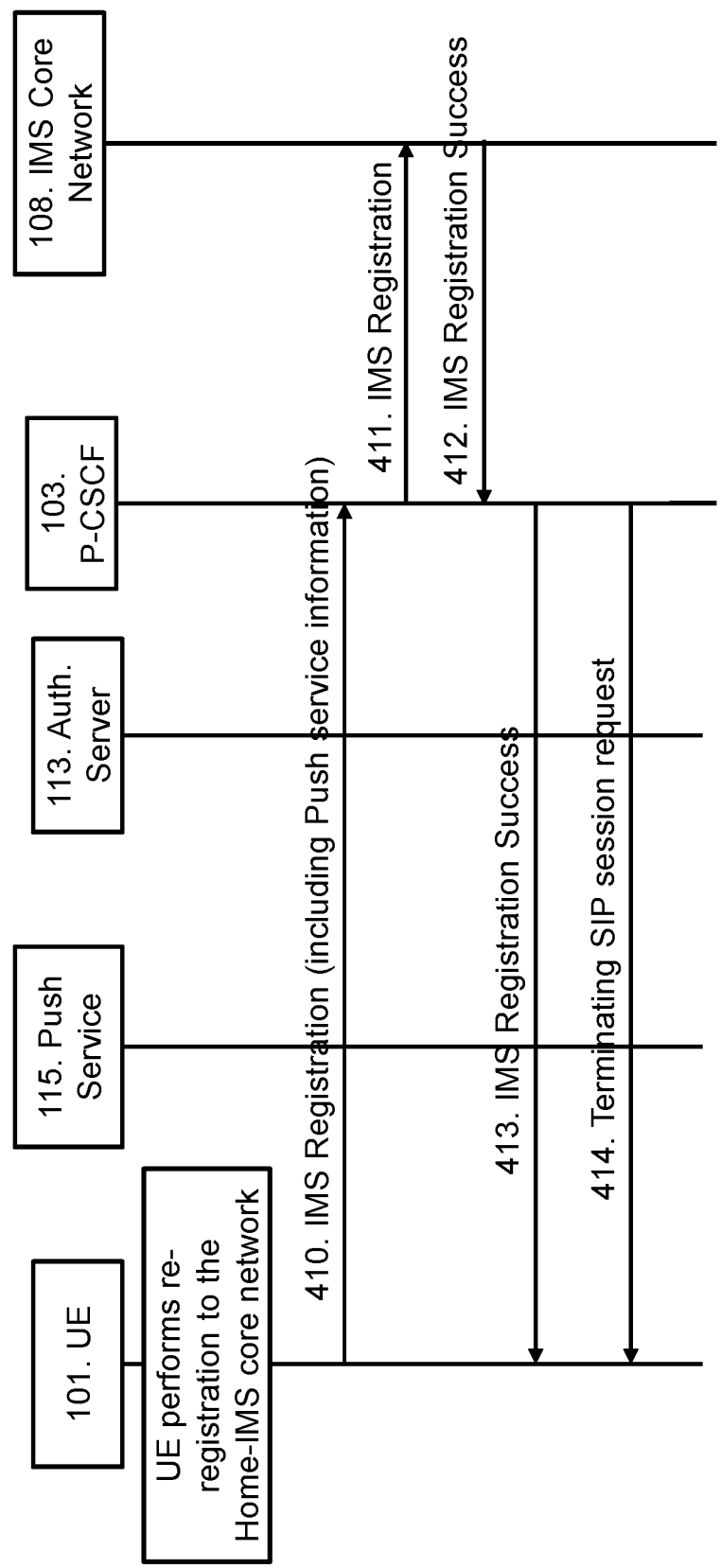

Comparing FIGS. 6a-6d with FIGS. 4a-4b: In FIGS. 4a-5b, re-registrations are not challenged by the core network node 508, which is a security risk. But in FIGS. 6a-6d, the core network node 508 challenges the re-registration of the UE 101 and therefore the first communication node 502 fetches the authentication data/key from the authentication server 513 when the UE 101 is in sleep mode.

Figure 7:
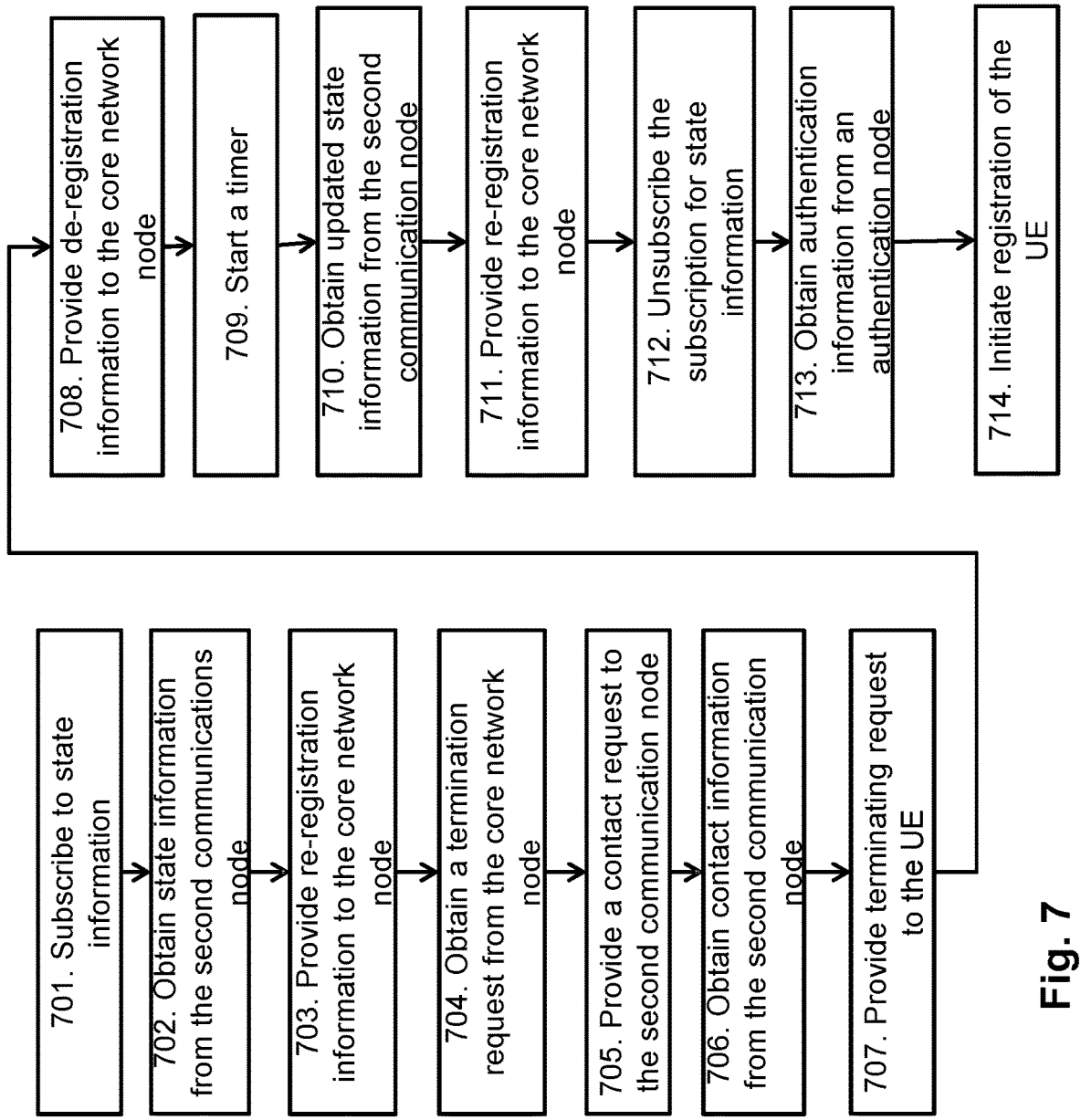
FIG. 7 is a flow chart illustrating a method performed by a first communication node.

The method described above will now be described seen from the perspective of the first communication node 503. FIG. 7 is a flowchart describing a method performed by the first communication node 503 for handling state change of a communication link 520 in a communications network 500. The first communication node 503 may comprise support information indicating that the UE 101 supports push notification. The support information may be received e.g. in an initial or previous SIP register message from the UE 101. The UE 101 may have previously registered with a core network node 508 via the first communication node 503. The first communication node 503 may be a server, a proxy, a proxy server, a CSCF node, a P-CSCF node or a node implementing a network edge function.

The method in FIG. 7 comprises at least one of the following steps to be performed by the first communication node 503, which steps may be performed in any suitable order than described below:

Step 701

This step corresponds to steps 607 and 608 in FIG. 6a. The first communication node 503 subscribes to state information indicating a state change of a communication link 520 between the UE 101 and a second communication node 513.

The subscription to the state information may be a subscription to a push link state service at the second communication node 513.

The subscribing may be performed by providing a state request for the state information to the second communication node 513.

The state change may be a change from a disconnected state to a connected state and/or from a connected state to a disconnected state. The state change may be a change from a first state to a second state, and/or from a second state to a first state.

The first state may be e.g. up, on, connected, attached, in service, alive etc. The second state may be down, off, disconnected, detached, broken, out of service, dead etc.

Step 702

This step corresponds to step 609 in FIG. 6a and step 617 in FIG. 6c. The first communication node 503 obtains, from the second communications node 513, the state information indicating the state change.

The obtaining may be in the form of transmission of a push notification of the state information.

Step 703

This step corresponds to steps 610, 611 in FIG. 6b. The first communication node 503 may provide, to a core network node 508, re-registration information indicating re-registration of the UE 101 without waking up the UE 101 from a sleep mode.

Step 704

This step corresponds to step 612 in FIG. 6c. The first communication node 503 may obtain, from a core network node 508, a termination request for termination of an ongoing communication session of the UE 101.

The termination request may e.g. be a request for terminating an ongoing call which the UE 101 is having, an ongoing data communication which the UE 101 is having, an ongoing video communication which the UE 101 is having etc.

Step 705

This step corresponds to step 613 in FIG. 6c. The first communication node 503 may provide, to the second communication node 513, a contact request for contact information of the UE 101 which the terminating request was intended for.

The contact request may comprise at least one registration parameter associated with the UE 101. The at least one registration parameter may be e.g. a PRID, the contact information may be e.g. the current contact information of the UE 101.

Step 706

This step corresponds to step 614 in FIG. 6c. The first communication node 503 may obtain, the contact information of the UE 101 from the second communication node 513.

Step 707

This step corresponds to step 615 in FIG. 6c. The first communication node may provide the terminating request to the UE 101 based on the contact information obtained from the second communication node 513.

Step 708

This step corresponds to steps 618 and 619 in FIG. 6c. When a state of the communication link 520 has changed from a connected state to a disconnected state, the first communication node 503 may provide, to a core network node 508, de-registration information indicating de-registration of the UE 101.

The de-registration information may be provided upon request from the core network node 508 or after a timer has expired. The timer may be referred to as a grace period, a grace interval etc.

Step 709

This step corresponds to steps 618 and 619 in FIG. 6c. The first communication node 503 may start a timer upon obtaining state information indicating the state change from the connected state to the disconnected state.

Step 710

This step corresponds to steps 618 and 619 in FIG. 6c. After having obtained the state information indicating that the state change is from the connected state to the disconnected state and before the timer expires, the first communication node 503 may obtain, from the second communication node 513, updated state information indicating that the state change is from the disconnected state to the connected state.

Step 711

This step corresponds to steps 610 and 611 in FIG. 6b. The first communication node 503 may provide, to the core network node 508, re-registration information indicating re-registration of the UE 101 when the state change is from the disconnected state to the connected state.

Step 712

This step corresponds to steps 620 and 621 in FIG. 6c. When the state change is from a connected state to a disconnected state, the first communication node 503 may unsubscribe the subscription for state information for the UE 101 to the second communication node 513.

Step 713

This step corresponds to steps 620A, 621A in FIG. 6d. When the state change is first from a connected state to a disconnected state, and then from the disconnected state to the connected state, the first communication node 503 may obtain authentication information from an authentication node 515.

Step 714

This step corresponds to steps 622A and 623A in FIG. 6d. The first communication node 503 may initiate registration of the UE 101 at the core network node 508.

Figure 8:
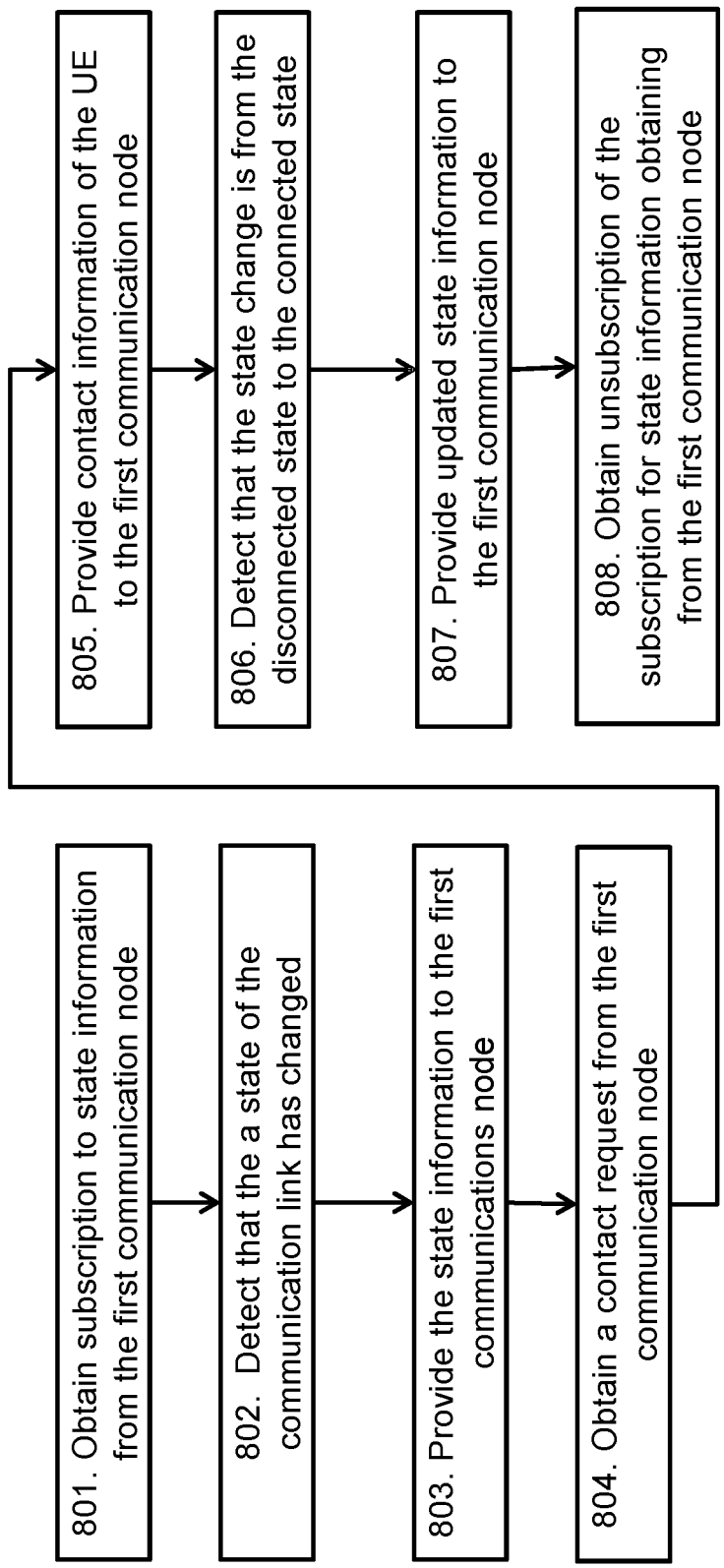
FIG. 8 is a flow chart illustrating a method performed by a second communication node.

The method described above will now be described seen from the perspective of the second communication node 513. FIG. 8 is a flowchart describing a method performed by the second communication node 513 for handling state change of a communication link 520 in a communications network 500. The second communication node 513 may be a PNS server. The method comprises at least one of the following steps to be performed by the second communication node 513, which steps may be performed in any suitable order than described below:

Step 801

This step corresponds to steps 607 and 608 in FIG. 6a. The second communication node 513 obtains, from the first communication node 503, a subscription to state information indicating a state change of the communication link 520 between the UE 101 and the second communication node 513.

Step 802

This step corresponds to step 609a in FIG. 6a and step 617a in FIG. 9c. The second communication node 513 detects that a state of the communication link 520 has changed from a connected state to a disconnected state or from the disconnected state to the connected state.

Step 803

This step corresponds to step 609 in FIG. 6a and step 617 in FIG. 6c. The second communication node 5013 provides, to the first communications node 503, the state information indicating the state change.

Step 804

This step corresponds to step 613 in FIG. 6c. The second communication node 513 may obtain, from the first communication node 503, a contact request for contact information of the UE 101.

Step 805

This step corresponds to step 614 in FIG. 6c. The second communication node 513 may provide the contact information of the UE 101 to the first communication node 503.

Step 806

After having detecting the state change from the connected state to the disconnected state, the second communication node 513 may detect that the state change is from the disconnected state to the connected state.

Step 807

This step corresponds to steps 618 and 619 in FIG. 6c. The second communication node 513 may provide, to the first communication node 503, updated state information indicating that the state change is from the disconnected state to the connected state.

Step 808

This step corresponds to steps 620 and 621 in FIG. 6c. When the state change is from the disconnected state to the connected state, the second communication node 513 may obtain, from the first communication node 503, unsubscription of the subscription for state information for the UE 101.

To perform the method steps shown in FIGS. 6 and 7 for handling state change of a communication link 520 in a communications network 500, the first communication node 503 may comprise arrangements as shown in FIG. 9a and/or FIG. 9b. The first communication node 503 may comprises support information indicating that the UE 101 supports push notification. The UE 101 may be previously registered with a core network node 508 via the first communication node 503. The first communication node 503 may be a server, a proxy, a proxy server, a CSCF node, a P-CSCF node or a node implementing a network edge function.

The first communication node 503 may comprise the following arrangement depicted in FIG. 9a:

The first communication node 503 is adapted to, e.g. by means of a subscribing unit 1001, subscribe to state information indicating a state change of a communication link 520 between a UE 101 and a second communication node 513.

The first communication node 503 is adapted to, e.g. by means of an obtaining unit 1003, obtain, from the second communications node 513, the state information indicating the state change.

The first communication node 503 may be adapted to, e.g. by means of a providing unit 1005, provide, to a core network node 508, re-registration information indicating re-registration of the UE 101 without waking up the UE 101 from a sleep mode.

The first communication node 503 may be adapted to, e.g. by means of the obtaining unit 1003, obtain, from a core network node 508, a termination request for termination of an ongoing communication session of the UE 101.

The first communication node 503 may be adapted to, e.g. by means of the providing unit 1005, provide, to the second communication node 513, a contact request for contact information of the UE 101 which the terminating request was intended for.

The first communication node 503 may be adapted to, e.g. by means of the obtaining unit 1003, obtain the contact information of the UE 101 from the second communication node 513.

The first communication node 503 may be adapted to, e.g. by means of the providing unit 1005, provide the terminating request to the UE 101 based on the contact information obtained from the second communication node 513.

The first communication node 503 may be adapted to, e.g. by means of the providing unit 1005, when a state of the communication link 520 has changed from a connected state to a disconnected state, provide, to a core network node 508, de-registration information indicating de-registration of the UE 101.

The de-registration information may be provided upon request from the core network node 508 or after a timer has expired.

The first communication node 503 may be adapted to, e.g. by means of a starting unit 1008, start a timer upon obtaining state information indicating the state change from the connected state to the disconnected state.

The first communication node 503 may be adapted to, e.g. by means of the obtaining unknit 1003, after having obtained the state information indicating that the state change is from the connected state to the disconnected state and before the timer expires, obtain, from the second communication node 513, updated state information indicating that the state change is from the disconnected state to the connected state.

The first communication node 503 may be adapted to, e.g. by means of the providing unit 1005, provide, to the core network node 508, re-registration information indicating re-registration of the UE 101 when the state change is from the disconnected state to the connected state.

The first communication node 503 may be adapted to, e.g. by means of an unsubscribing unit 1010, when the state change is from a connected state to a disconnected state, unsubscribe the subscription for state information for the UE 101 to the second communication node 513.

The first communication node 503 may be adapted to, e.g. by means of the obtaining unit 1003, when the state change is first from a connected state to a disconnected state, and then from the disconnected state to the connected state, obtain authentication information from an authentication node 515.

The first communication node 503 may be adapted to, e.g. by means of an initiating unit 1013, initiate registration of the UE 101 at the core network node 508.

The first communication node 503 may be implemented through one or more processors, such as a processor 1017 in the first communication node 503 depicted in FIG. 9a, together with computer program code for performing the functions and actions described herein. A processor, as used herein, may be understood to be a hardware component. The program code mentioned above may also be provided as a computer program product, for instance in the form of a data carrier carrying computer program code for performing the embodiments herein when being loaded into the first communication node 503. One such carrier may be in the form of a CD ROM disc. It is however feasible with other data carriers such as a memory stick. The computer program code may furthermore be provided as pure program code on a server and downloaded to the first communication node 503.

The first communication node 503 may comprise a memory 1018 comprising one or more memory units. The memory 1018 is arranged to be used to store obtained information, store data, configurations, schedulings, and applications etc. to perform the methods herein when being executed in the first communication node 503.

The first communication node 503 may receive information from, e.g. the second communication node 513, through a receiving port 1019. The receiving port 1019 may be connected to one or more antennas in first communication node 503. The first communication node 503 may receive information from another structure in the communications system 100 through the receiving port 1019. Since the receiving port 1019 may be in communication with the processor 1017, the receiving port 1019 may then send the received information to the processor 1017. The receiving port 1019 may be configured to receive other information.

The processor 1017 in the first communication node 503 may be configured to transmit or send information to e.g. the second communication node 513 or another structure in the communications system 100, through a sending port 1020, which may be in communication with the processor 1017, and the memory 1018.

The first communication node 503 may comprise the subscribing unit 1001, the obtaining unit 1003, the providing unit 1005, the starting unit 1008, the unsubscribing unit 1010, the initiating unit 1013, other units 1015 etc.

Those skilled in the art will also appreciate that the subscribing unit 1001, the obtaining unit 1003, the providing unit 1005, the starting unit 1008, the unsubscribing unit 1010, the initiating unit 1013, other units 1015 described above may refer to a combination of analog and digital circuits, and/or one or more processors configured with software and/or firmware, e.g., stored in memory, that, when executed by the one or more processors such as the processor 1017, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The different units 1001-1015 described above may be implemented as one or more applications running on one or more processors such as the processor 1017.

The methods described herein for the first communication node 503 may be respectively implemented by means of a computer program 1021 product, comprising instructions, i.e., software code portions, which, when executed on at least one processor 1017, cause the at least one processor 1017 to carry out the actions described herein, as performed by the first communication node 503. The computer program 1021 product may be stored on a computer-readable storage medium 1022. The computer-readable storage medium 1022, having stored thereon the computer program 1021, may comprise instructions which, when executed on at least one processor 1017, cause the at least one processor 1017 to carry out the actions described herein, as performed by the first communication node 503. The computer-readable storage medium 1022 may be a non-transitory computer-readable storage medium, such as a CD ROM disc, or a memory stick. The computer program 1022 product may be stored on a carrier containing the computer program 1022 just described, wherein the carrier is one of an electronic signal, optical signal, radio signal, or the computer-readable storage medium 1022, as described above.

The first communication node 503 may comprise a communication interface configured to facilitate communications between the first communication node 503 and other nodes or devices, e.g., the second communication node 513, or another structure. The interface may include a transceiver configured to transmit and receive radio signals over an air interface in accordance with a suitable standard.

The first communication node 503 may comprise the following arrangement depicted in FIG. 9b. The first communication node 503 may comprise a processing circuitry 1017, e.g., one or more processors such as the processor 1017, in the first communication node 503 and the memory 1018. The first communication node 503 may also comprise a radio circuitry 1023, which may comprise e.g., the receiving port 1019 and the sending port 1020. The processing circuitry 1017 may be configured to, or operable to, perform the method actions according to FIG. 6-7, in a similar manner as that described in relation to FIG. 9a. The radio circuitry 1023 may be configured to set up and maintain at least a wireless connection with the first communication node 503. Circuitry may be understood herein as a hardware component.

The first communication node 503 may be operative to operate in the communications system 100. The first communication node 503 may comprise the processing circuitry 1017 and the memory 1018. The memory 1018 comprises instructions executable by the processing circuitry 1017. The first communication node 503 is operative to perform the actions described herein in relation to the first communication node 503, e.g., in FIGS. 6 and 7.

Figure 10A:
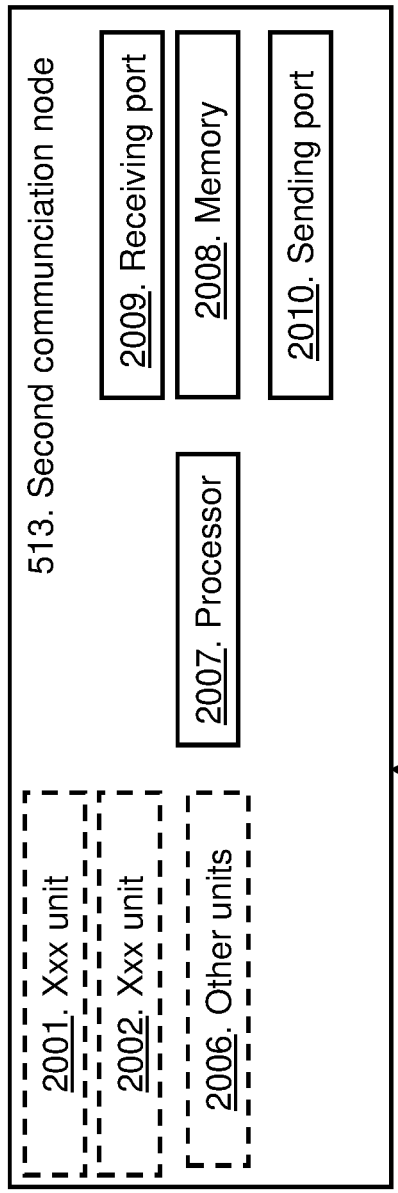
FIG. 10a is a schematic drawing illustrating a second communication node.
Figure 10B:
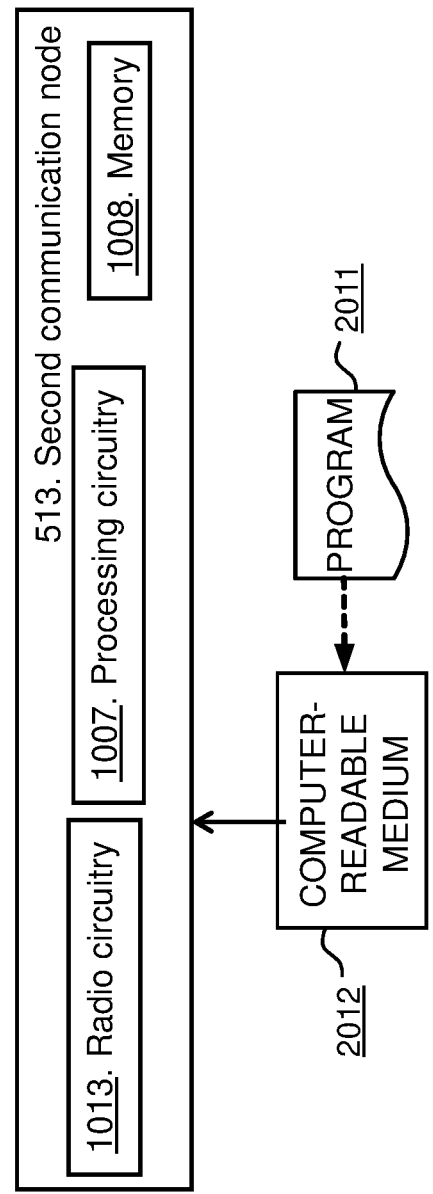
FIG. 10b is a schematic drawing illustrating a second communication node.

To perform the method steps shown in FIGS. 6 and 8 for handling state change of a communication link 520 in a communications network 500, the second communication node 513 may comprise arrangements as shown in FIG. 10a and/or FIG. 10b. The second communication node 513 may be a PNS server.

The second communication node 513 may comprise the following arrangement depicted in FIG. 10a:

The second communication node 513 is adapted to, e.g. by means of an obtaining unit 2001, obtain, from a first communication node 503, a subscription to state information indicating a state change of the communication link 520 between a UE 101 and the second communication node 513.

The second communication node 513 is adapted to, e.g. by means of a detecting unit 2003, detect that a state of the communication link 520 has changed from a connected state to a disconnected state or from the disconnected state to the connected state.

The second communication node 513 is adapted to, e.g. by means of a providing unit 2005, provide, to the first communications node 503, the state information indicating the state change.

The second communication node 513 may be adapted to, e.g. by means of the obtaining unit 2001, obtain, from the first communication node 503, a contact request for contact information of the UE 101.

The second communication node 513 may be adapted to, e.g. by means of the providing unit 2005, provide the contact information of the UE 101 to the first communication node 503.

The second communication node 513 may be adapted to, e.g. by means of the detecting unit 2003, after having detecting the state change from the connected state to the disconnected state, detect that the state change is from the disconnected state to the connected state.

The second communication node 513 may be adapted to, e.g. by means of the providing unit 2005, provide, to the first communication node 503, updated state information indicating that the state change is from the disconnected state to the connected state.

The second communication node 513 may be adapted to, e.g. by means of the obtaining unit 2001, when the state change is from the disconnected state to the connected state, obtain, from the first communication node 503, un-subscription of the subscription for state information for the UE 101.

The method performed by the second communication node 513 may be implemented through one or more processors, such as a processor 2007 in the second communication node 513 depicted in FIG. 10a, together with computer program code for performing the functions and actions described herein. A processor, as used herein, may be understood to be a hardware component. The program code mentioned above may also be provided as a computer program product, for instance in the form of a data carrier carrying computer program code for performing the methods described herein when being loaded into second communication node 513. One such carrier may be in the form of a CD ROM disc. It is however feasible with other data carriers such as a memory stick. The computer program code may furthermore be provided as pure program code on a server and downloaded to the second communication node 513.

The second communication node 513 may comprise a memory 2008 comprising one or more memory units. The memory 2008 is arranged to be used to store obtained information, store data, configurations, schedulings, and applications etc. to perform the methods herein when being executed in the second communication node 513.

The second communication node 513 may receive information from, e.g., the first communication node 503 through a receiving port 2009. The receiving port 2009 may be connected to one or more antennas in second communication node 513. The second communication node 513 may receive information from another structure in the communications system 100 through the receiving port 2009. Since the receiving port 2009 may be in communication with the processor 2007, the receiving port 2009 may then send the received information to the processor 2007. The receiving port 2009 may also be configured to receive other information.

The processor 2007 in the second communication node 513 may be further configured to transmit or send information to e.g., the first communication node 503, or another structure in the communications system 100, through a sending port 210, which may be in communication with the processor 2007, and the memory 2008.

The second communication node 513 may comprise the obtaining unit 2001, the detecting unit 2003, the providing unit 2005, other units 2006 etc.

The obtaining unit 2001, the detecting unit 2003, the providing unit 2005, other units 2006 etc. described above may refer to a combination of analog and digital circuits, and/or one or more processors configured with software and/or firmware, e.g., stored in memory, that, when executed by the one or more processors such as the processor 2001, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The different units 2001-2006 described above may be implemented as one or more applications running on one or more processors such as the processor 2007.

Thus, the methods described herein for the second communication node 513 may be respectively implemented by means of a computer program 2011 product, comprising instructions, i.e., software code portions, which, when executed on at least one processor 2007, cause the at least one processor 2007 to carry out the actions described herein, as performed by the second communication node 513. The computer program 2011 product may be stored on a computer-readable storage medium 2012. The computer-readable storage medium 2012, having stored thereon the computer program 2011, may comprise instructions which, when executed on at least one processor 2007, cause the at least one processor 207 to carry out the actions described herein, as performed by the second communication node 513. The computer-readable storage medium 2012 may be a non-transitory computer-readable storage medium, such as a CD ROM disc, or a memory stick. The computer program 2011 product may be stored on a carrier containing the computer program 2011 just described, wherein the carrier is one of an electronic signal, optical signal, radio signal, or the second computer-readable storage medium 2012, as described above.

The second communication node 513 may comprise a communication interface configured to facilitate communications between the second communication node 513 and other nodes or devices, e.g., the first communication node 503, or another structure. The interface may include a transceiver configured to transmit and receive radio signals over an air interface in accordance with a suitable standard.

The second communication node 513 may comprise the following arrangement depicted in FIG. 10b. The second communication node 513 may comprise a processing circuitry 2015, e.g., one or more processors such as the processor 2007, in the second communication node 513 and the memory 2008. The second communication node 513 may also comprise a radio circuitry 2013, which may comprise e.g., the receiving port 2009 and the sending port 2010. The processing circuitry 2015 may be configured to, or operable to, perform the method actions according to FIGS. 6 and 8 in a similar manner as that described in relation to FIG. 10a. The radio circuitry 2013 may be configured to set up and maintain at least a wireless connection with the network node 101. Circuitry may be understood herein as a hardware component.

The second communication node 513 may be operative to operate in the communications system 100. The second communication node 513 may comprise the processing circuitry 2015 and the memory 2008. The memory 2008 comprises instructions executable by said processing circuitry 2015. The second communication node 513 is operative to perform the actions described herein in relation to the second communication node 513, e.g., in FIGS. 6 and 8.

Further Extensions and Variations

Telecommunication network connected via an intermediate network to a host computer.

Figure 11:
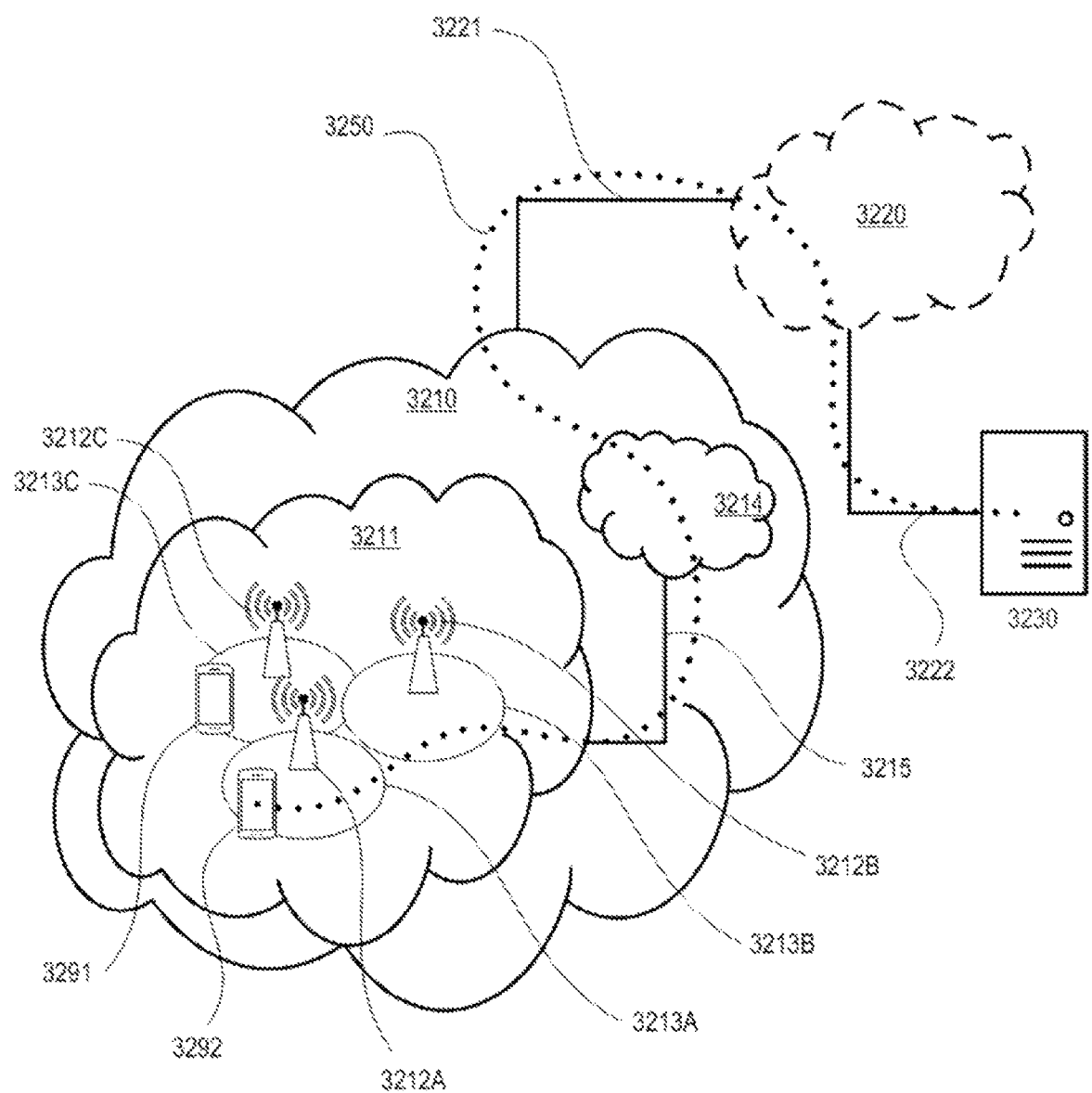
FIG. 11 is a schematic block diagram illustrating a telecommunication network connected via an intermediate network to a host computer.

With reference to FIG. 11, a communication system includes telecommunication network 3210 such as the communications network 100, for example, a 3GPP-type cellular network, which comprises access network 3211, such as a radio access network, and core network 3214. Access network 3211 comprises a plurality of network nodes 105. Base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A plurality of user equipments, such as the UE 101 may be comprised in the communications system 100. In FIG. 11, a first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in FIG. 11, but a sole UE may be in the coverage area or a sole UE may be connecting to the corresponding base station 3212. Any of the UEs 3291, 3292 may be considered examples of the UE 101.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 11 as a whole enables connectivity between the connected UEs 3291, 3292 and host computer 3230. The connectivity may be described as an Over-The-Top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. Base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

In relation to FIGS. 12-16 which are described next, the base station is an example of a network node.

Figure 12:
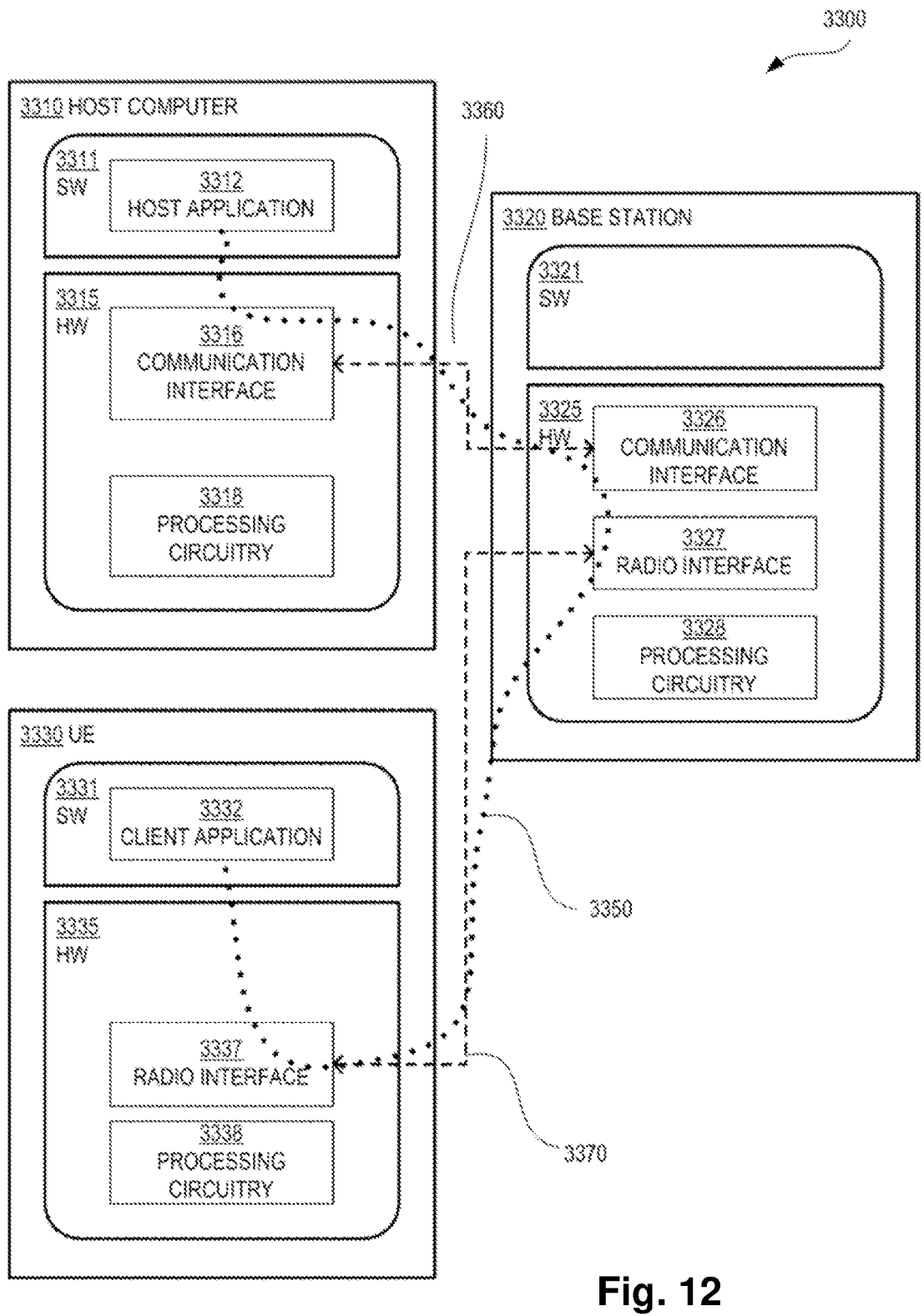
FIG. 12 is a schematic block diagram of a host computer communicating via a base station with a UE over a partially wireless connection.

FIG. 12 illustrates a host computer communicating via a network node with a UE 101 over a partially wireless connection.

The UE 101 and the network node, e.g., a base station and host computer discussed in the preceding paragraphs will now be described with reference to FIG. 12. In communication system 3330, such as the communications system 100, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 includes the network node exemplified in FIG. 12 as a base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with the UE 101, exemplified in FIG. 33012 as a UE 3330 located in a coverage area served by base station 3320. Communication interface 3326 may be configured to facilitate connection 3360 to host computer 3310. Connection 3360 may be direct or it may pass through a core network (not shown in FIG. 12) of the telecommunication system and/or through one or more intermediate networks outside the telecommunication system. Hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 33012 may be similar or identical to host computer 3230, one of base stations 3212a, 3212b, 3212c and one of UEs 3291, 3292 of FIG. 11, respectively. This is to say, the inner workings of these entities may be as shown in FIG. 12 and independently, the surrounding network topology may be that of FIG. 11.

In FIG. 12, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

The performance of OTT services provided to UE 3330 using OTT connection 3350 is improved, in which wireless connection 3370 forms the last segment. The spectrum efficiency, and latency, is improved and thereby provide benefits such as reduced user waiting time, better responsiveness and extended battery lifetime.

A measurement procedure may be provided for the purpose of monitoring data rate, latency and other factors which may be improved. There may be network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. Sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. Measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figures 13, 14:
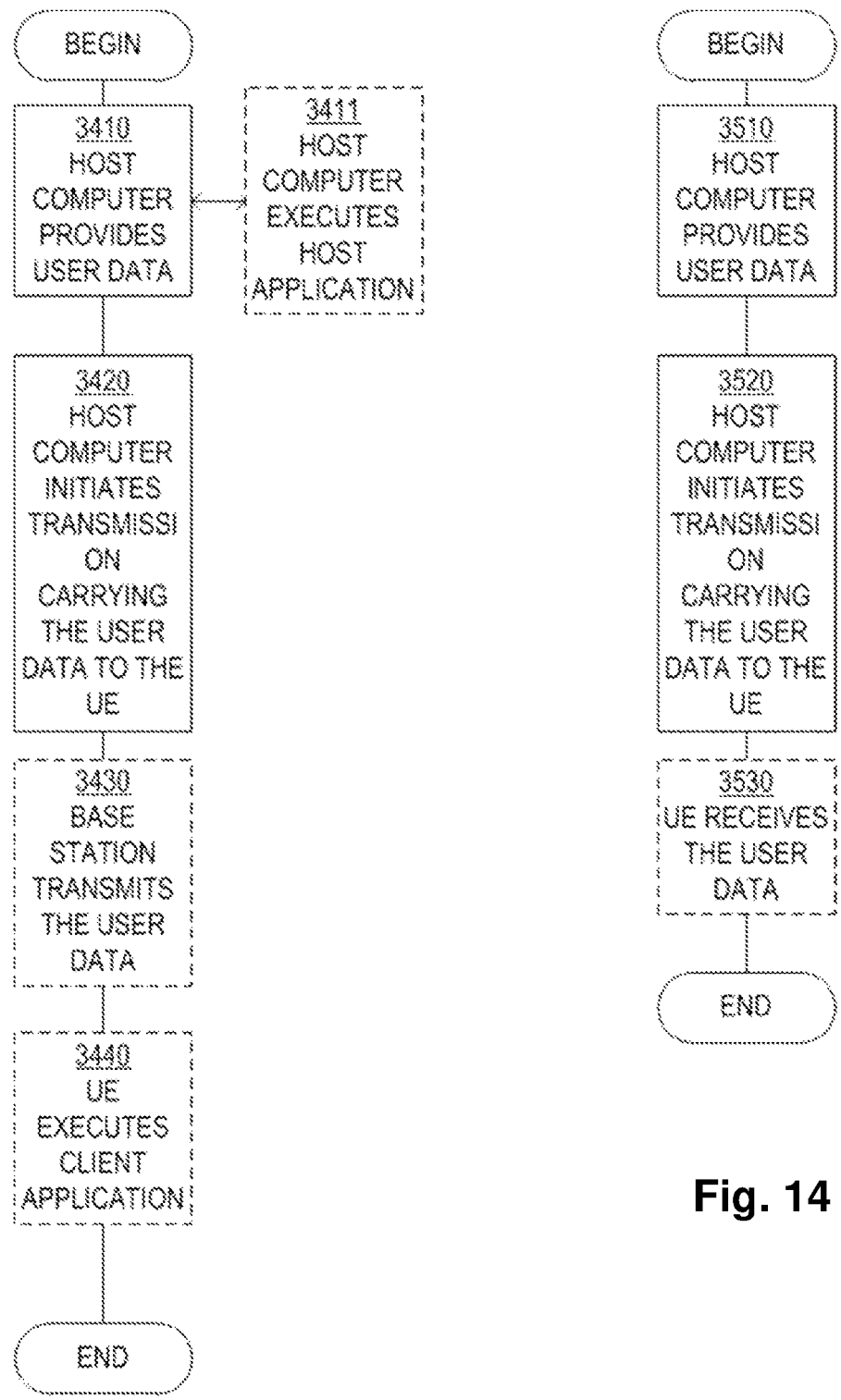
FIG. 13 is a flowchart depicting a method in a communications network including a host computer, a base station and a UE.
FIG. 14 is a flowchart depicting a method in a communications network including a host computer, a base station and a UE.

FIG. 13 illustrates methods implemented in a communication system including a host computer, a base station and a UE. FIG. 13 is a flowchart illustrating a method implemented in a communication system. The communication system includes a host computer, a base station and a UE which may be those described with reference to FIG. 11 and FIG. 12. For simplicity of the present disclosure, only drawing references to FIG. 13 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated. In step 3440 (which may also be optional), the UE executes a client application associated with the host application executed by the host computer.

FIG. 14 illustrates methods implemented in a communication system including a host computer, a base station and a UE. FIG. 14 is a flowchart illustrating a method implemented in a communication system. The communication system includes a host computer, a base station and a UE which may be those described with reference to FIG. 11 and FIG. 12. For simplicity of the present disclosure, only drawing references to FIG. 14 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station. In step 3530 (which may be optional), the UE receives the user data carried in the transmission.

Figures 15, 16:
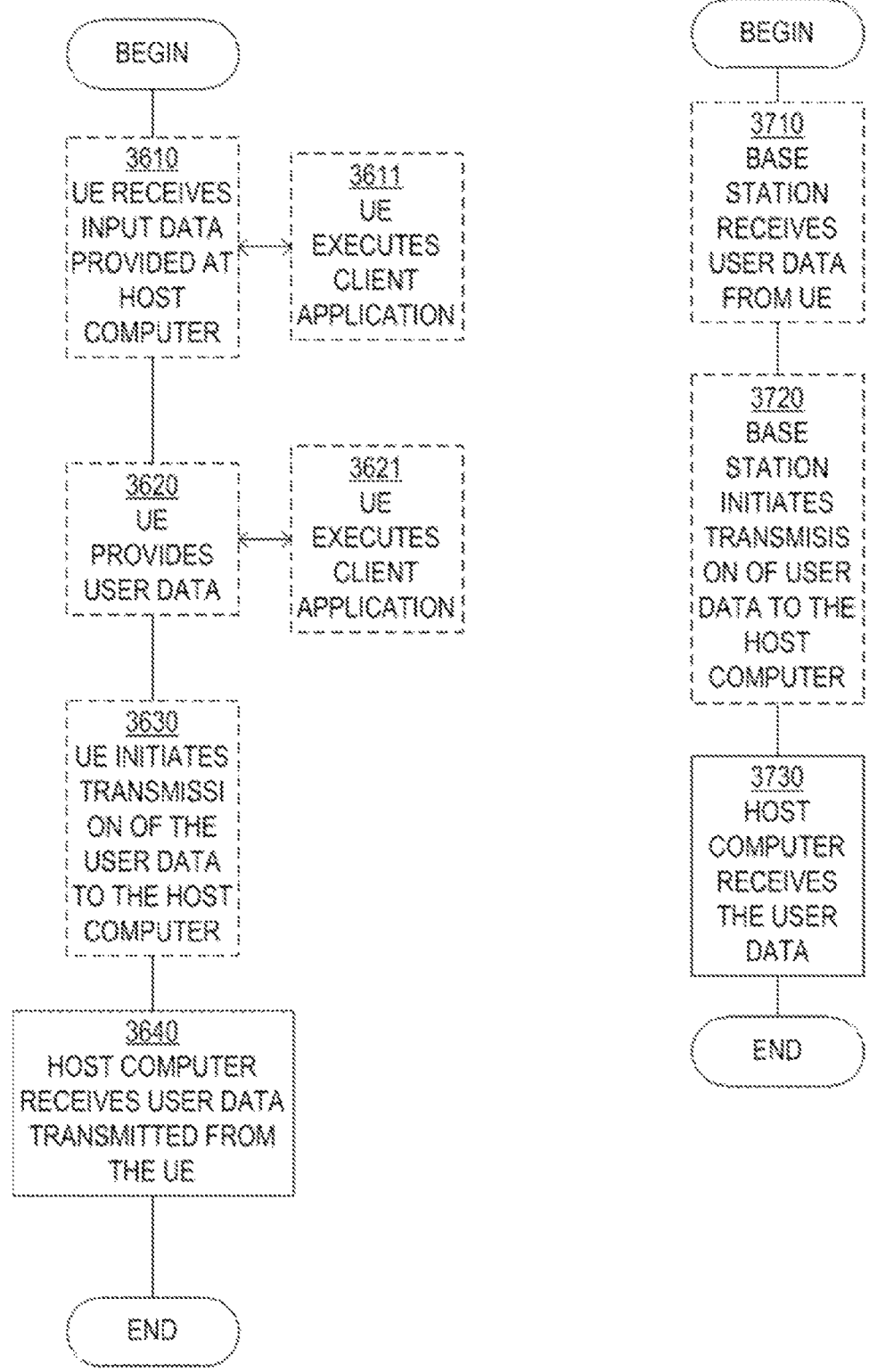
FIG. 15 is a flowchart depicting a method in a communications system including a host computer, a base station and a UE.
FIG. 16 is a flowchart depicting a method in a communications system including a host computer, a base station and a UE.

FIG. 15 illustrates methods implemented in a communication system including a host computer, a base station and a user equipment. FIG. 15 is a flowchart illustrating a method implemented in a communication system. The communication system includes a host computer, a network node and a UE 101 which may be those described with reference to FIG. 11 and FIG. 12. For simplicity of the present disclosure, only drawing references to FIG. 15 will be included in this section. In step 3610 (which may be optional), the UE 101 receives input data provided by the host computer. Additionally or alternatively, in step 3620, the UE 101 provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE.

FIG. 16 illustrates methods implemented in a communication system including a host computer, a base station and a UE. FIG. 16 is a flowchart illustrating a method implemented in a communication system. The communication system includes a host computer, a base station and a UE which may be those described with reference to FIG. 11 and FIG. 12. For simplicity of the present disclosure, only drawing references to FIG. 16 will be included in this section. In step 3710 (which may be optional), the base station receives user data from the UE. In step 3720 (which may be optional), the base station initiates transmission of the received user data to the host computer. In step 3730 (which may be optional), the host computer receives the user data carried in the transmission initiated by the base station.

Some embodiments may be summarized as follows:

A base station configured to communicate with a UE 101, the base station comprising a radio interface and processing circuitry configured to perform one or more of the actions described herein.

A communication system 100 including a host computer comprising:
processing circuitry configured to provide user data; and
a communication interface configured to forward the user data to a cellular network for transmission to a UE 101,
wherein the cellular network comprises a network node having a radio interface and processing circuitry, the base station's processing circuitry configured to perform one or more of the actions described herein as performed by the network node.

The communication system may further including the network node.

The communication system may further include the UE 101, wherein the UE 101 is configured to communicate with the network node.

The communication system, wherein:
the processing circuitry of the host computer is configured to execute a host application, thereby providing the user data; and
the UE 101 comprises processing circuitry configured to execute a client application associated with the host application.

A method implemented in a network node, comprising one or more of the actions described herein as performed by the network node.

A method implemented in a communication system 100 including a host computer, a base station and a UE 101, the method comprising:
at the host computer, providing user data; and
at the host computer, initiating a transmission carrying the user data to the UE 101 via a cellular network comprising the network node, wherein the network node performs one or more of the actions described herein as performed by the network node.

The method may further comprise:
at the network node, transmitting the user data.

The user data may be provided at the host computer by executing a host application, and the method may further comprise:
at the UE 101, executing a client application associated with the host application.

A UE 101 configured to communicate with a network node, the UE 101 comprising a radio interface and processing circuitry configured to perform one or more of the actions described herein as performed by the UE 101.

A communication system 100 including a host computer comprising:
processing circuitry configured to provide user data; and
a communication interface configured to forward user data to a cellular network for transmission to a UE 101,
wherein the UE comprises a radio interface and processing circuitry, the UE's processing circuitry configured to perform one or more of the actions described herein as performed by the UE 101.

The communication system may further including the UE 101.

The communication system 100, wherein the cellular network further includes a network node configured to communicate with the UE 101.

The communication system 100, wherein:
the processing circuitry of the host computer is configured to execute a host application, thereby providing the user data; and
the UE's processing circuitry is configured to execute a client application associated with the host application.

A method implemented in a UE 101, comprising one or more of the actions described herein as performed by the UE 101.

A method implemented in a communication system 100 including a host computer, a network node and a UE 101, the method comprising:
at the host computer, providing user data; and
at the host computer, initiating a transmission carrying the user data to the UE 101 via a cellular network comprising the base station, wherein the UE 101 performs one or more of the actions described herein as performed by the UE 101.

The method may further comprise:

at the UE 101, receiving the user data from the network node.

A UE 101 configured to communicate with a network node, the UE 101 comprising a radio interface and processing circuitry configured to perform one or more of the actions described herein as performed by the UE 101.

A communication system 100 including a host computer comprising:

a communication interface configured to receive user data originating from a transmission from a UE 101 to a network node, wherein the UE 101 comprises a radio interface and processing circuitry, the UE's processing circuitry configured to: perform one or more of the actions described herein as performed by the UE 101.

The communication system 100 may further include the UE 101.

The communication system 100 may further include the network node, wherein the network node comprises a radio interface configured to communicate with the UE 101 and a communication interface configured to forward to the host computer the user data carried by a transmission from the UE 101 to the base station.

The communication system 100, wherein:

the processing circuitry of the host computer is configured to execute a host application; and the UE's processing circuitry is configured to execute a client application associated with the host application, thereby providing the user data.

The communication system 100, wherein:

the processing circuitry of the host computer is configured to execute a host application, thereby providing request data; and the UE's processing circuitry is configured to execute a client application associated with the host application, thereby providing the user data in response to the request data.

A method implemented in a UE 101, comprising one or more of the actions described herein as performed by the UE 101.

The method may further comprise:

providing user data; and forwarding the user data to a host computer via the transmission to the network node.

A method implemented in a communication system 100 including a host computer, a network node and a UE 101, the method comprising:

at the host computer, receiving user data transmitted to the network node from the UE 101, wherein the UE 101 performs one or more of the actions described herein as performed by the UE 101.

The method may further comprise:

at the UE 101, providing the user data to the network node.

The method may further comprise:

at the UE 101, executing a client application, thereby providing the user data to be transmitted; and at the host computer, executing a host application associated with the client application.

The method may further comprise:

at the UE 101, executing a client application; and at the UE 101, receiving input data to the client application, the input data being provided at the host computer by executing a host application associated with the client application, wherein the user data to be transmitted is provided by the client application in response to the input data.

A network node configured to communicate with a UE 101, the network node comprising a radio interface and processing circuitry configured to perform one or more of the actions described herein as performed by the network node.

A communication system 100 including a host computer comprising a communication interface configured to receive user data originating from a transmission from a UE 101 to a base station, wherein the network node comprises a radio interface and processing circuitry, the base station's processing circuitry configured to perform one or more of the actions described herein as performed by the network node.

The communication system 100 may further include the network node.

The communication system 100 may further include the UE 101, wherein the UE 101 is configured to communicate with the network node.

The communication system 100 wherein:

the processing circuitry of the host computer is configured to execute a host application;

the UE 101 is configured to execute a client application associated with the host application, thereby providing the user data to be received by the host computer.

A method implemented in a network node, comprising one or more of the actions described herein as performed by any of the network node.

A method implemented in a communication system including a host computer, a network node and a UE 101, the method comprising:

at the host computer, receiving, from the network node, user data originating from a transmission which the base station has received from the UE 101, wherein the UE 101 performs one or more of the actions described herein as performed by the UE 101.

The method may further comprise:

at the network node, receiving the user data from the UE 101.

The method may further comprise:

at the network node, initiating a transmission of the received user data to the host computer.

Summarized, the embodiments herein relate to a method of registration alert and auto-deregistration for a push based UE 101.

The registration-based wake-up mechanism may be automatically handled by the core network node 508. There may be automatic handling of de-registration of dead UE's 101 by subscribing to the push link status service with the second communication node 513 from the core network node 508 without the need for waiting for the registration timer to expire.

This UE agnostic mechanism may enable a service where the first communication node 503 gets subscribed to the second communication node 513 to avail a push link status service to keep track of the status of the interface between the second communication node 513 and the UE, and then keeps the registration of UE 101 intact with the core network node 508 on behalf of the UE 101.

On getting notified by the second communication node 513 about the breakdown of the communication link 520 between the UE 101 and the second communication node 513, the first communication node 503 may automatically triggers de-registration of the subscriber associated with the UE 101 from the core network node 508.

All terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods may, without departing from the embodiments herein, be performed in another order than the order in which they appear herein.

The invention claimed is:

1. A method performed by a first communication node for handling state change of a communication link in a communications network, the method comprising:
   subscribing to state information indicating a state change of a communication link between a User Equipment (UE) and a second communication node;
   obtaining, from the second communication node, the state information indicating the state change;
   obtaining, from a core network node, a terminating request for termination of an ongoing communication session of the UE;
   providing, to the second communication node, a contact request for contact information of the UE which the terminating request was intended for;
   obtaining the contact information of the UE from the second communication node; and
   providing the terminating request to the UE based on the contact information obtained from the second communication node.

2. The method according to claim 1, further comprising:
   providing, to a core network node, re-registration information indicating re-registration of the UE without waking up the UE from a sleep mode.

3. The method according to claim 1, further comprising:
   when a state of the communication link has changed from a connected state to a disconnected state, providing, to a core network node, de-registration information indicating de-registration of the UE.

4. The method according to claim 3, wherein the de-registration information is provided upon request from the core network node or after a timer has expired.

5. The method according to claim 4, further comprising:
   starting a timer upon obtaining state information indicating the state change from the connected state to the disconnected state.

6. A first communication node for handling state change of a communication link in a communications network, the first communication node comprising:
   processing circuitry; and
   a memory comprising instructions which, when executed by the processing circuitry, cause the first communication node to:
      subscribe to state information indicating a state change of a communication link between a User Equipment (UE) and a second communication node;
      obtain, from the second communication node, the state information indicating the state change;
      obtain, from a core network node, a terminating request for termination of an ongoing communication session of the UE;
      provide, to the second communication node, a contact request for contact information of the UE which the terminating request was intended for;
      obtain the contact information of the UE from the second communication node; and
      provide the terminating request to the UE based on the contact information obtained from the second communication node.

7. The first communication node according to claim 6, further to:
   provide, to a core network node, re-registration information indicating re-registration of the UE without waking up the UE from a sleep mode.

8. The first communication node according to claim 6, further to:
   when a state of the communication link has changed from a connected state to a disconnected state, provide, to a core network node, de-registration information indicating de-registration of the UE.

9. The first communication node according to claim 8, wherein the de-registration information is provided upon request from the core network node or after a timer has expired.

10. The first communication node according to claim 9, further to:
   start a timer upon obtaining state information indicating the state change from the connected state to the disconnected state.

* * * * *